(12) United States Patent
Oh

(10) Patent No.: US 10,939,158 B2
(45) Date of Patent: Mar. 2, 2021

(54) ELECTRONIC APPARATUS, DISPLAY APPARATUS AND CONTROL METHOD THEREOF

(71) Applicant: SAMSUNG ELECTRONICS CO., LTD., Suwon-si (KR)

(72) Inventor: Seung-bo Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/868,023

(22) Filed: Jan. 11, 2018

(65) Prior Publication Data

US 2018/0376194 A1  Dec. 27, 2018

Related U.S. Application Data

(60) Provisional application No. 62/523,947, filed on Jun. 23, 2017.

(30) Foreign Application Priority Data

Sep. 22, 2017 (KR) .......................... 10-2017-0122497

(51) Int. Cl.
*H04N 21/422* (2011.01)
*H04N 21/433* (2011.01)
*H04N 21/4147* (2011.01)
*H04N 21/482* (2011.01)
*H04N 21/485* (2011.01)

(52) U.S. Cl.
CPC ... *H04N 21/42204* (2013.01); *H04N 21/4147* (2013.01); *H04N 21/4334* (2013.01); *H04N 21/482* (2013.01)

(58) Field of Classification Search
None
See application file for complete search history.

(56) References Cited

U.S. PATENT DOCUMENTS

| 9,667,910 B2 | 5/2017 | Messmer |
| 2007/0097269 A1* | 5/2007 | Tsukamoto .......... H04N 5/4403 348/705 |
| 2014/0078165 A1* | 3/2014 | Messmer ............... H04N 1/603 345/589 |

(Continued)

FOREIGN PATENT DOCUMENTS

| EP | 3 016 379 | 5/2016 |
| EP | 3 121 815 | 1/2017 |

(Continued)

OTHER PUBLICATIONS

U.S. Appl. No. 62/523,069, dated Jun. 21, 2017.*
Translation of U.S. Appl. No. 62/523,069.*

*Primary Examiner* — Hung Q Dang
(74) *Attorney, Agent, or Firm* — Nixon & Vanderhye P.C.

(57) ABSTRACT

An example electronic apparatus includes a communication interface including communication interface circuitry; and a processor configured to provide video content and dynamic metadata corresponding to video content of each predetermined content period to an external display apparatus through the communication interface, wherein the processor is configured to provide metadata based on graphic content to the display apparatus during at least one content period in which the graphic content is activated.

15 Claims, 25 Drawing Sheets

(56) References Cited

U.S. PATENT DOCUMENTS

| | | | |
|---|---|---|---|
| 2016/0300537 A1 | 10/2016 | Hoffman et al. | |
| 2016/0336040 A1 | 11/2016 | Long et al. | |
| 2017/0105042 A1* | 4/2017 | Toma | G11B 27/3027 |
| 2018/0018932 A1* | 1/2018 | Atkins | G09G 5/10 |
| 2018/0249182 A1* | 8/2018 | Andrivon | H04N 19/65 |
| 2018/0278985 A1* | 9/2018 | De Haan | H04N 21/845 |
| 2019/0222818 A1* | 7/2019 | Yamamoto | G06T 5/009 |
| 2020/0193573 A1* | 6/2020 | Thebault | H04N 9/68 |

FOREIGN PATENT DOCUMENTS

| | | |
|---|---|---|
| KR | 10-2016-0097023 | 8/2016 |
| KR | 10-2016-0121782 | 10/2016 |
| KR | 10-2017-0039764 | 4/2017 |
| WO | WO 2014/130213 | 8/2014 |
| WO | WO 2016/095361 | 6/2016 |

* cited by examiner

FIG. 5A

| HDMI 2.0 Transmission | Bits |
|---|---|
| application_version | 2 |
| targeted_system_display_maximum_luminance | 5 |
| average_maxrgb | 8 |
| distribution_maxrgb_percentiles[ 0 ] | 8 |
| distribution_maxrgb_percentiles[ 1 ] | 9 |
| distribution_maxrgb_percentiles[@1%] | 9 |
| distribution_maxrgb_percentiles[@25%] | 8 |
| distribution_maxrgb_percentiles[@50%] | 8 |
| distribution_maxrgb_percentiles[@75%] | 8 |
| distribution_maxrgb_percentiles[@90%] | 8 |
| distribution_maxrgb_percentiles[ @95%] | 8 |
| distribution_maxrgb_percentiles[ @99.98%] | 8 |
| num_bezier_curve_anchors | 4 |
| knee_point_x | 10 |
| knee_point_y | 10 |
| bezier_curve_anchors[ 1] | 7 |
| bezier_curve_anchors[ 2] | 7 |
| bezier_curve_anchors[ 3] | 7 |
| bezier_curve_anchors[ 4] | 7 |
| bezier_curve_anchors[ 5] | 7 |
| bezier_curve_anchors[ 6] | 7 |
| bezier_curve_anchors[ 7] | 7 |
| bezier_curve_anchors[ 8] | 7 |
| bezier_curve_anchors[ 9] | 7 |
| "Graphics" | 16 |

FIG. 5B

| Byte/Bit # | 7 | 6 | 5 | 4 | 3 | 2 | 1 | 0 | Graphics On (Static Metadata Packet) | Example 4K content |
|---|---|---|---|---|---|---|---|---|---|---|
| HB0 | 1 | VSIF type code = 1(0x01) | | | | | | | Assume uniform luminance distribution of scene and derive the percentile as follows:<br><br>1. Last Bin with 99% = Lmax(2086)<br>2. Bin representing P% = Lmax * P / 99 | |
| HB1 | VSIF version = 1(0x01) | | | | | | | | | |
| HB2 | 0 | 0 | 0 | Length = 27(0x1B) | | | | | | |
| PB00 | Checksum | | | | | | | | | |
| PB01 | IEEE OUI, Third Octet = (0xd2) | | | | | | | | | |
| PB02 | IEEE OUI, Second Octet = (0x5d) | | | | | | | | | |
| PB03 | IEEE OUI, First Octet = (0xc4) | | | | | | | | | |
| PB04 | Reserved | | | | | | | | | |
| PB05 | | | | | | | | | | |
| PB06 | distribution_maxrgb_percentiles[w][0] = 1% | | | | | | | | int(Lmax * 1 / 99) | 400 |
| PB07 | | | | | | | | | | |
| PB08 | distribution_maxrgb_percentiles[w][1] = 5% | | | | | | | | int(Lmax * 5 / 99) | 2020 |
| PB09 | | | | | | | | | | |
| PB10 | distribution_maxrgb_percentiles[w][2] = 10% | | | | | | | | int(Lmax * 10 / 99) | 4040 |
| PB11 | | | | | | | | | | |
| PB12 | distribution_maxrgb_percentiles[w][3] = 25% | | | | | | | | int(Lmax * 25 / 99) | 10100 |
| PB13 | | | | | | | | | | |
| PB14 | distribution_maxrgb_percentiles[w][4] = 50% | | | | | | | | int(Lmax * 50 / 99) | 20200 |
| PB15 | | | | | | | | | | |
| PB16 | distribution_maxrgb_percentiles[w][5] = 75% | | | | | | | | int(Lmax * 75 / 99) | 30300 |
| PB17 | | | | | | | | | | |
| PB18 | distribution_maxrgb_percentiles[w][6] = 90% | | | | | | | | int(Lmax * 90 / 99) | 36360 |
| PB19 | | | | | | | | | | |
| PB20 | distribution_maxrgb_percentiles[w][7] = 95% | | | | | | | | int(Lmax * 95 / 99) | 38380 |
| PB21 | | | | | | | | | | |
| PB22 | distribution_maxrgb_percentiles[w][8] = 98% | | | | | | | | int(Lmax * 98 / 99) | 39590 |
| PB23 | | | | | | | | | | |
| PB24 | distribution_maxrgb_percentiles[w][9] = 99% | | | | | | | | Lmax = int(Lmax_2086 * 10) | Lmax = int(4000 * 10) = 40000 |
| PB25 | | | | | | | | | | |
| PB26 | Reserved + Overlay Flag On/Off = 0x0 | | | | | | | | | |

FIG. 7C

| Data Byte number | Contents | Group |
|---|---|---|
| Data Byte 3 | display_primaries_x[0], LSB | 1 |
| Data Byte 4 | display_primaries_x[0], MSB | |
| Data Byte 5 | display_primaries_x[0], LSB | |
| Data Byte 6 | display_primaries_x[0], MSB | |
| Data Byte 7 | display_primaries_x[1], LSB | |
| Data Byte 8 | display_primaries_x[1], MSB | |
| Data Byte 9 | display_primaries_x[1], LSB | |
| Data Byte 10 | display_primaries_x[1], MSB | |
| Data Byte 11 | display_primaries_x[2], LSB | |
| Data Byte 12 | display_primaries_x[2], MSB | |
| Data Byte 13 | display_primaries_x[2], LSB | |
| Data Byte 14 | display_primaries_x[2], MSB | |
| Data Byte 15 | white_point_x, LSB | 2 |
| Data Byte 16 | white_point_x, MSB | |
| Data Byte 17 | white_point_y, LSB | |
| Data Byte 18 | white_point_y, MSB | |
| Data Byte 19 | max_display_mastering_luminance, LSB | 3 |
| Data Byte 20 | max_display_mastering_luminance, MSB | |
| Data Byte 21 | max_display_mastering_luminance, LSB | 4 |
| Data Byte 22 | max_display_mastering_luminance, MSB | |
| Data Byte 23 | Maximum Content Light Level, LSB | 5 |
| Data Byte 24 | Maximum Content Light Level, MSB | |
| Data Byte 25 | Maximum Frame-average Light Level, LSB | 6 |
| Data Byte 26 | Maximum Frame-average Light Level, MSB | |

| HDMI 2.0 Transmission | Bits | | Remark |
|---|---|---|---|
| application version | 2 | | |
| targeted_system_display_maximum_luminance | 5 | | range=0:1024 nit, 1 unit = 32 nit |
| average maxrgb | 8 | | range=0:4096 nit, 1 unit = 16 nit |
| distribution_maxrgb_percentiles[0] | 8 | 99Y | range=0:4096 nit, 1 unit = 16 nit |
| distribution_maxrgb_percentiles[1] | 9 | 18G | range=0:4096 nit, 1 unit = 8 nit |
| distribution_maxrgb_percentiles[@1%] | 9 | 1% percentile | range=0:4096 nit, 1 unit = 8 nit |
| distribution_maxrgb_percentiles[@25%] | 8 | 25% percentile | range=0:4096 nit, 1 unit = 16 nit |
| distribution_maxrgb_percentiles[@50%] | 8 | 50% percentile | range=0:4096 nit, 1 unit = 16 nit |
| distribution_maxrgb_percentiles[@75%] | 8 | 75% percentile | range=0:4096 nit, 1 unit = 16 nit |
| distribution_maxrgb_percentiles[@90%] | 8 | 90% percentile | range=0:4096 nit, 1 unit = 16 nit |
| distribution_maxrgb_percentiles[@95%] | 8 | 95% percentile | range=0:4096 nit, 1 unit = 16 nit |
| distribution_maxrgb_percentiles[@99.98%] | 8 | 99.98% percentile | range=0:4096 nit, 1 unit = 16 nit |
| num_bezier_curve_anchors | 4 | | Use if applicable. Max =9 |
| knee_point_x | 10 | k_x | Use if applicable |
| knee_point_y | 10 | k_y | Use if applicable |
| bezier_curve_anchors[1] | 7 | p1 | Use if applicable |
| bezier_curve_anchors[2] | 7 | p2 | Use if applicable |
| bezier_curve_anchors[3] | 7 | p3 | Use if applicable |
| bezier_curve_anchors[4] | 7 | p4 | Use if applicable |
| bezier_curve_anchors[5] | 7 | p5 | Use if applicable |
| bezier_curve_anchors[6] | 7 | p6 | Use if applicable |
| bezier_curve_anchors[7] | 7 | p7 | Use if applicable |
| bezier_curve_anchors[8] | 7 | p8 | Use if applicable |
| bezier_curve_anchors[9] | 7 | p9 | Use if applicable |
| "Graphics" | 16 | | Default=0 |

FIG. 7G

Table 750 (HDMI 2.0 Transmission):

| HDMI 2.0 Transmission | Bits | Graphics On | Example 4K content |
|---|---|---|---|
| application_version | 2 | | |
| targeted_system_display_maximum_luminance | 5 | | |
| average_maxrgb | 8 | | |
| distribution_maxrgb_percentiles[ 0 ] | 8 | | |
| distribution_maxrgb_percentiles[ 1 ] | 9 | int(Lmax * 1 / 99) | 400 |
| distribution_maxrgb_percentiles[@1%] | 9 | int(Lmax * 5 / 99) | 2020 |
| distribution_maxrgb_percentiles[@25%] | 8 | int(Lmax * 25 / 99) | 10100 |
| distribution_maxrgb_percentiles[@50%] | 8 | int(Lmax * 50 / 99) | 20200 |
| distribution_maxrgb_percentiles[@75%] | 8 | int(Lmax * 75 / 99) | 30300 |
| distribution_maxrgb_percentiles[@90%] | 8 | int(Lmax * 90 / 99) | 36360 |
| distribution_maxrgb_percentiles[@95%] | 8 | int(Lmax * 95 / 99) | 38380 |
| distribution_maxrgb_percentiles[@99.98%] | 8 | Lmax = int(Lmax_2086 * 10) | Lmax = int(4000 * 10) =40000 |
| num_bezier_curve_anchors | 4 | | Use if applicable. Max =9 |
| knee_point_x | 10 | k_x | Use if applicable |
| knee_point_y | 10 | k_y | Use if applicable |
| bezier_curve_anchors[1] | 7 | p1 | Use if applicable |
| bezier_curve_anchors[2] | 7 | p2 | Use if applicable |
| bezier_curve_anchors[3] | 7 | p3 | Use if applicable |
| bezier_curve_anchors[4] | 7 | p4 | Use if applicable |
| bezier_curve_anchors[5] | 7 | p5 | Use if applicable |
| bezier_curve_anchors[6] | 7 | p6 | Use if applicable |
| bezier_curve_anchors[7] | 7 | p7 | Use if applicable |
| bezier_curve_anchors[8] | 7 | p8 | Use if applicable |
| bezier_curve_anchors[9] | 7 | p9 | Use if applicable |
| "Graphics" | 16 | | Default=0 |

Table 710:

| Data Byte number | Contents | Group |
|---|---|---|
| Data Byte 3 | display_primaries_x[0], LSB | |
| Data Byte 4 | display_primaries_x[0], MSB | |
| Data Byte 5 | display_primaries_y[0], LSB | |
| Data Byte 6 | display_primaries_y[0], MSB | 1 |
| Data Byte 7 | display_primaries_x[1], LSB | |
| Data Byte 8 | display_primaries_x[1], MSB | |
| Data Byte 9 | display_primaries_y[1], LSB | |
| Data Byte 10 | display_primaries_y[1], MSB | |
| Data Byte 11 | display_primaries_x[2], LSB | |
| Data Byte 12 | display_primaries_x[2], MSB | |
| Data Byte 13 | display_primaries_y[2], LSB | |
| Data Byte 14 | display_primaries_y[2], MSB | |
| Data Byte 15 | white_point_x, LSB | 2 |
| Data Byte 16 | white_point_x, MSB | |
| Data Byte 17 | white_point_y, LSB | |
| Data Byte 18 | white_point_y, MSB | |
| Data Byte 19 | max_display_mastering_luminance, LSB | 3 |
| Data Byte 20 | max_display_mastering_luminance, MSB | |
| Data Byte 21 | min_display_mastering_luminance, LSB | 4 |
| Data Byte 22 | min_display_mastering_luminance, MSB | |
| Data Byte 23 | Maximum Content Light Level, LSB | 5 |
| Data Byte 24 | Maximum Content Light Level, MSB | |
| Data Byte 25 | Maximum Frame-average Light Level, LSB | 6 |
| Data Byte 26 | Maximum Frame-average Light Level, MSB | |

FIG. 7H

Table 710:

| Data Byte number | Contents | Group |
|---|---|---|
| Data Byte 3 | display_primaries_x[0], LSB | 1 |
| Data Byte 4 | display_primaries_x[0], MSB | 1 |
| Data Byte 5 | display_primaries_x[0], LSB | 1 |
| Data Byte 6 | display_primaries_x[0], MSB | 1 |
| Data Byte 7 | display_primaries_x[1], LSB | 1 |
| Data Byte 8 | display_primaries_x[1], MSB | 1 |
| Data Byte 9 | display_primaries_x[1], LSB | 1 |
| Data Byte 10 | display_primaries_x[1], MSB | 1 |
| Data Byte 11 | display_primaries_x[2], LSB | 1 |
| Data Byte 12 | display_primaries_x[2], MSB | 1 |
| Data Byte 13 | display_primaries_x[2], LSB | 1 |
| Data Byte 14 | display_primaries_x[2], MSB | 1 |
| Data Byte 15 | white_point_x, LSB | 2 |
| Data Byte 16 | white_point_x, MSB | 2 |
| Data Byte 17 | white_point_y, LSB | 2 |
| Data Byte 18 | white_point_y, MSB | 2 |
| Data Byte 19 | max_display_mastering_luminance, LSB | 3 |
| Data Byte 20 | max_display_mastering_luminance, MSB | 3 |
| Data Byte 21 | max_display_mastering_luminance, LSB | 4 |
| Data Byte 22 | max_display_mastering_luminance, MSB | 4 |
| Data Byte 23 | Maximum Content Light Level, LSB | 5 |
| Data Byte 24 | Maximum Content Light Level, MSB | 5 |
| Data Byte 25 | Maximum Frame-average Light Level, LSB | 6 |
| Data Byte 26 | Maximum Frame-average Light Level, MSB | 6 |

Table 750 — HDMI 2.0 Transmission:

| HDMI 2.0 Transmission | Bits | Graphics On | Example 4K content |
|---|---|---|---|
| application_version | 2 | | |
| targeted_system_display_maximum_luminance | 5 | | 400 |
| average_maxrgb | 8 | int(Lmax * 1 / 99) | 2020 |
| distribution_maxrgb_percentiles[0] | 8 | int(Lmax * 5 / 99) | 4040 |
| distribution_maxrgb_percentiles[1] | 9 | int(Lmax * 10 / 99) | 10100 |
| distribution_maxrgb_percentiles[@1%] | 9 | int(Lmax * 25 / 99) | 20200 |
| distribution_maxrgb_percentiles[@25%] | 8 | int(Lmax * 50 / 99) | 30300 |
| distribution_maxrgb_percentiles[@50%] | 8 | int(Lmax * 75 / 99) | 36360 |
| distribution_maxrgb_percentiles[@75%] | 8 | int(Lmax * 90 / 99) | 38380 |
| distribution_maxrgb_percentiles[@90%] | 8 | int(Lmax * 95 / 99) | 39590 |
| distribution_maxrgb_percentiles[@95%] | 8 | int(Lmax * 98 / 99) | |
| distribution_maxrgb_percentiles[@99.98%] | 8 | Lmax = int(Lmax_2086 * 10) | Lmax = int(4000 * 10) = 40000 |
| num_bezier_curve_anchors | 4 | | Use if applicable. Max = 9 |
| knee_point_x | 10 | k_x | Use if applicable |
| knee_point_y | 10 | k_y | Use if applicable |
| bezier_curve_anchors[1] | 7 | p1 | Use if applicable |
| bezier_curve_anchors[2] | 7 | p2 | Use if applicable |
| bezier_curve_anchors[3] | 7 | p3 | Use if applicable |
| bezier_curve_anchors[4] | 7 | p4 | Use if applicable |
| bezier_curve_anchors[5] | 7 | p5 | Use if applicable |
| bezier_curve_anchors[6] | 7 | p6 | Use if applicable |
| bezier_curve_anchors[7] | 7 | p7 | Use if applicable |
| bezier_curve_anchors[8] | 7 | p8 | Use if applicable |
| bezier_curve_anchors[9] | 7 | p9 | Use if applicable |
| "Graphics" | 16 | | Default=0 |

ELECTRONIC APPARATUS, DISPLAY APPARATUS AND CONTROL METHOD THEREOF

CROSS-REFERENCE TO RELATED APPLICATIONS

This application is based on and claims priority under 35 U.S.C. Section 119 from Korean Patent Application No. 10-2017-0122497, filed on Sep. 22, 2017, in the Korean Intellectual Property Office, and from U.S. Provisional Application No. 62/523,947, filed on Jun. 23, 2017, in U.S. Patent and Trademark Office, the contents of each of which are incorporated by reference herein in their entireties.

BACKGROUND

Technical Field

The present disclosure generally relates to a display apparatus and a control method thereof, and more particularly, to an electronic apparatus and a display apparatus capable of reproducing a video content, and a control method thereof.

Description of Related Art

In accordance with the development of electronic technology, various types of electronic apparatuses have been developed and come into widespread use. In particular, display apparatuses used in various places such as homes, offices, public places, and the like, have been continuously developed over the recent years.

Recently, in the case of a high dynamic range (HDR) content, technology for providing sharper image quality by performing image processing on each scene of HDR content based on dynamic metadata, in which characteristics of each scene of the HDR content are reflected, has been developed. However, this technology can cause a problem in that brightness, or the like, of a graphic menu continuously changes in a case in which the graphic menu is provided during reproduction of the HDR content.

SUMMARY

Example embodiments of the present disclosure can overcome the above disadvantages, as well as other disadvantages not described above. The example embodiments of the present disclosure are not required to overcome any or all of the disadvantages described above, and an example embodiment of the present disclosure may not necessarily overcome any of the problems described above.

The present disclosure provides an example electronic apparatus and an example display apparatus capable of reproducing video content to maintain brightness and a color sensor of graphic content in a case in which the graphic content is provided during reproduction of video content based on dynamic metadata, and a control method thereof.

According to an aspect of the present disclosure, an example electronic apparatus includes: a communication interface; and a processor configured to provide video content and dynamic metadata corresponding to video content of each predetermined content period to an external display apparatus through the communication interface, wherein the processor is configured to provide metadata based on graphic content to the display apparatus during at least one content period in which the graphic content is activated, when the graphic content is activated.

The processor may be configured to provide dynamic metadata corresponding to video content of a specific content period to the display apparatus during the period in which the graphic content is activated, when the graphic content is activated in the specific content period.

The processor may be configured to provide predetermined static metadata corresponding to the graphic content to the display apparatus during the period in which the graphic content is activated.

The processor may be configured to provide predetermined static metadata corresponding to the video content to the display apparatus during the period in which the graphic content is activated.

The processor may be configured to convert dynamic metadata corresponding to each content period based on static metadata of at least one of the video content and the graphic content, and then provide the converted dynamic metadata to the display apparatus, during the period in which the graphic content is activated.

The processor may be configured to replace at least some of brightness information of content, tone mapping information, maximum brightness information of a mastering monitor, and RGB information of the content included in the dynamic metadata corresponding to each content period with at least some of maximum brightness information of the content and maximum brightness information of the mastering monitor included in the static metadata and provide to the display apparatus the dynamic metadata for which at least some metadata are replaced, during the period in which the graphic content is activated.

The processor may be configured to obtain calculated values by calculating at least some of maximum brightness information of content and maximum brightness information of a mastering monitor included in the static metadata according to a predetermined equation, and may replace at least some of brightness information of the content, tone mapping information, maximum brightness information of the mastering monitor, and RGB information of the content included in the dynamic metadata corresponding to each content period with the obtained calculated values and provide to the display apparatus the dynamic metadata of which at least some of the metadata are replaced, during the period in which the graphic content is activated.

The processor may be configured to change a pixel value of the graphic content based on the dynamic metadata corresponding to the video content and provide to the display apparatus the graphic content of which the pixel value is changed, during the period in which the graphic content is activated.

The processor may be configured to identify whether or not the graphic content is activated based on a command (e.g., a user command).

The processor may be configured to identify whether or not the graphic content is activated based on at least one of an application programming interface (API) and a predetermined program.

The graphic content may include at least one of an interactive graphic (IG), a presentation graphic (PG), and a graphical user interface (GUI).

According to another aspect of the present disclosure, an example display apparatus includes: a communication interface; a display; and a processor configured to control receiving video content and dynamic metadata corresponding to video content of each predetermined content period from an external electronic apparatus through the communication interface, process the video content based on the dynamic metadata, and display the processed video content through the display, wherein the processor processes the video content and graphic content based on metadata based on the graphic content during at least one content period in which the graphic content is activated.

The metadata based on the graphic content may be at least one of dynamic metadata corresponding to a specific content period in which the graphic content is activated, pre-stored metadata corresponding to the graphic content, static metadata corresponding to the graphic content, static metadata corresponding to the video content, and metadata converted from dynamic metadata corresponding to each content period based on static metadata of at least one of the video content and the graphic content.

The metadata based on the graphic content may be metadata obtained by replacing at least some of brightness information of content, tone mapping information, maximum brightness information of a mastering monitor, and RGB information of the content included in dynamic metadata corresponding to each content period with at least some of the maximum brightness information of the content and maximum brightness information of the mastering monitor included in static metadata of at least one of the video content and the graphic content.

The metadata based on the graphic content may be metadata obtained by replacing at least some of brightness information of content, tone mapping information, maximum brightness information of a mastering monitor, and RGB information of the content included in dynamic metadata corresponding to each content period with calculated values obtained by calculating at least some of the maximum brightness information of the content and maximum brightness information of the mastering monitor included in static metadata of at least one of the video content and the graphic content according to a predetermined equation.

The processor may be configured to perform image processing on the video content and the graphic content based on characteristics of the graphic content during the at least one content period in which the graphic content is activated, when information indicating whether or not the graphic content is activated and the characteristics of the graphic content is received from an electronic apparatus.

The processor may be configured to control receiving the dynamic metadata and static metadata of at least one of the video content and the graphic content from an external electronic apparatus, process the video content based on the dynamic metadata during a period in which the graphic content is inactivated, and process the video content and the graphic content based on the static metadata during the content period in which the graphic content is activated.

According to still another aspect of the present disclosure, an example control method of an electronic apparatus includes: providing video content and dynamic metadata corresponding to video content of each predetermined content period to an external display apparatus; and providing metadata based on graphic content to the display apparatus during at least one content period in which the graphic content is activated, when the graphic content is activated.

In the providing of the metadata based on the graphic content to the display apparatus, dynamic metadata corresponding to each content period may be converted based on static metadata of at least one of the video content and the graphic content and be then provided to the display apparatus, during the period in which the graphic content is activated.

In the providing of the metadata based on the graphic content to the display apparatus, calculated values may be obtained by calculating at least some of maximum brightness information of content and maximum brightness information of a mastering monitor included in the static metadata according to a predetermined equation, and at least some of brightness information of the content, tone mapping information, maximum brightness information of the mastering monitor, and RGB information of the content included in the dynamic metadata corresponding to each content period may be replaced with the obtained calculated values and be then provided to the display apparatus, during the period in which the graphic content is activated.

According to the diverse example embodiments of the present disclosure, in a case in which graphic content is provided during the reproduction of video content based on the dynamic metadata, graphic content may be provided that sufficiently reflects an intention of a graphic content producer. That is, graphic content may be provided in which brightness and a color sense intended by the graphic content producer at the time of producing the graphic content are maintained.

BRIEF DESCRIPTION OF THE DRAWINGS

The above and/or other aspects, features and attendant advantages of the present disclosure will be more apparent and readily understood from the following detailed description of certain example embodiments of the present disclosure, taken in conjunction with the accompanying drawings, in which like reference numerals refer to like elements, and wherein:

FIGS. 5A and 5B are views for describing various implementations of dynamic metadata according to an example embodiment of the present disclosure;

FIGS. 7A, 7B, 7C, 7D, 7E, 7F, 7G and 7H are views for describing a method of processing a graphic content according to another example embodiment of the present disclosure;

DETAILED DESCRIPTION

Example embodiments will be described in detail with reference to the accompanying drawings. However, the scope of the present disclosure is not limited to the example embodiments. Instead, the example embodiments may be variously modified. While describing example embodiments, if the specific description regarding a known technology obscures the gist of the disclosure, the specific description is omitted.

In example embodiments, relational terms such as first and second, and the like, may be used to distinguish one entity from another entity, without necessarily implying any actual relationship or order between such entities.

The terms used herein are solely intended to explain a specific example embodiment, and not to limit the scope of the present disclosure. It is to be understood that the singular forms "a," "an," and "the" include plural referents unless the context clearly dictates otherwise. The terms "include," "comprise," "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof. The expression, "at least one of a and b," should be understood as including only a, only b, or both a and b.

In the example embodiments disclosed herein, a term "module" or "unit" refers to an element that performs at least one function or operation. The "module" or "unit" may be realized as hardware, software, or combinations thereof. In addition, a plurality of "modules" or a plurality of "units" may be integrated into at least one module and may be realized as at least one processor except for "modules" or "units" that should be realized in a specific hardware.

Figure 1:
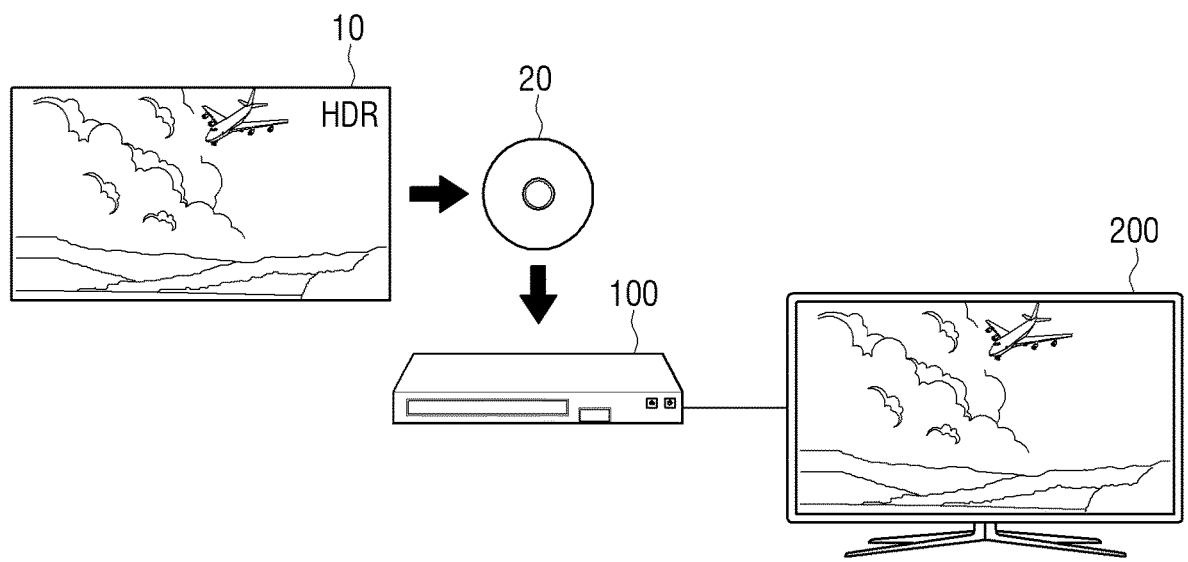
FIG. 1 is a view for describing an implementation of a content reproducing system according to an example embodiment of the present disclosure.

FIG. 1 is a view for describing an implementation of a content reproducing system according to an example embodiment of the present disclosure.

Generally, content producers provide content encoded based on certain intended brightnesses, colors, and the like, of images. Generally, in a case of a high dynamic range (HDR) content providing a more vivid image by improving a contrast ratio of a screen, encoding information corresponding to an encoding manner (process) is provided together with the HDR content. As an example, according to a standard of the next generation optical disc storage medium such as a Blu-ray disc (hereinafter, referred to as a BD), content 10 encoded based on brightness, a color, and the like, of images intended by a producer is provided together with related metadata.

For example, as illustrated in FIG. 1, a case is assumed in which HDR content 10 is recorded on an optical disc (for example, a Blu-ray disc) 20 and is reproduced through an electronic apparatus 100 to be displayed through a display apparatus 200. Here, the electronic apparatus 100 may be, for example, a Blu-ray player, a digital versatile disc (DVD) player, or the like. However, the electronic apparatus 100 is not limited thereto, but may be implemented by various kinds of reproducing apparatuses (or source apparatuses). In addition, the display apparatus 200 may be, for example, a television (TV). However, the display apparatus 200 is not limited thereto, but may be implemented by various apparatuses that may perform a display function, such as a head mounted display (HMD), a near eye display (NED), a large format display (LFD), display signage, a digital information display (DID), a video wall, and the like.

When the electronic apparatus 100 reproduces the HDR content 10 recorded in the optical disc 20, the HDR content 10 is provided to the display apparatus 200 together with corresponding metadata (for example, information such as brightness (or luminance) information (maximum brightness, average brightness, and the like) of the HDR content, brightness information of a mastering monitor, tone mapping information, and the like). The mastering monitor can refer to a monitor used in at least one of a process of producing the HDR content 10 and a process of testing the HDR content 10. Here, the metadata may be static metadata or dynamic metadata. According to an example, metadata according to a specific standard may include information such as distribution_maxrgb_percentiles, Bezier_curve_anchors, targeted_system_display_maximum_luminance, average_maxrgb, knee_point, and the like.

The static metadata are metadata in which characteristics of the entire HDR content are reflected, and can refer to metadata statically applied for the HDR content, that is, statically applied regardless of a change in a scene. The dynamic metadata are metadata in which characteristics of each scene of the HDR content are reflected, and can refer to metadata dynamically provided for each scene of the HDR content. Here, the scenes, which can refer to periods having similar image quality characteristics, may be distinguished from scenes depending on a space change in a scenario divided by a content producer such as a film producer, or the like, according to the related art. That is, the scenes may be divided into different scenes depending on brightness, color, and the like, of an image even in the same space in the scenario divided by the content producer such as the film producer, or the like. However, dynamic metadata are not necessarily limited thereto, but may also be provided for each scene, each frame, or each of various content periods depending on the space change in the scenario divided by the content producer such as the film producer, or the like, according to the related art.

Generally, the HDR content provided together with static metadata is called static HDR content, and HDR content provided together with dynamic metadata is called dynamic HDR content. Hereinafter, for convenience of explanation, static HDR content will be described on the assumption that the HDR content is provided together with static metadata, and dynamic HDR content will be described on the assumption that HDR content is provided together with dynamic metadata.

Meanwhile, according to an example, the display apparatus 200 may be implemented to support an HDR function. Here, the HDR function means a function of performing image quality conversion (or image quality processing) and tone mapping on the HDR content 10 based on the metadata provided together with the HDR content and displaying the HDR content 10 on which the image quality conversion (or the image quality processing) and the tone mapping are performed. Here, tone mapping can refer to a method of mapping and representing an original tone of the HDR content 10 to a dynamic range of the display apparatus 200 based on the received metadata. As an example, maximum luminance of the HDR content 10 is mapped to a display capability of the display apparatus 200, that is, a maximum luminance that may be represented by the display apparatus 200, based on the metadata, and the HDR content 10 is provided for which the maximum luminance is mapped to the display capability of the display apparatus 200.

Figure 2A:
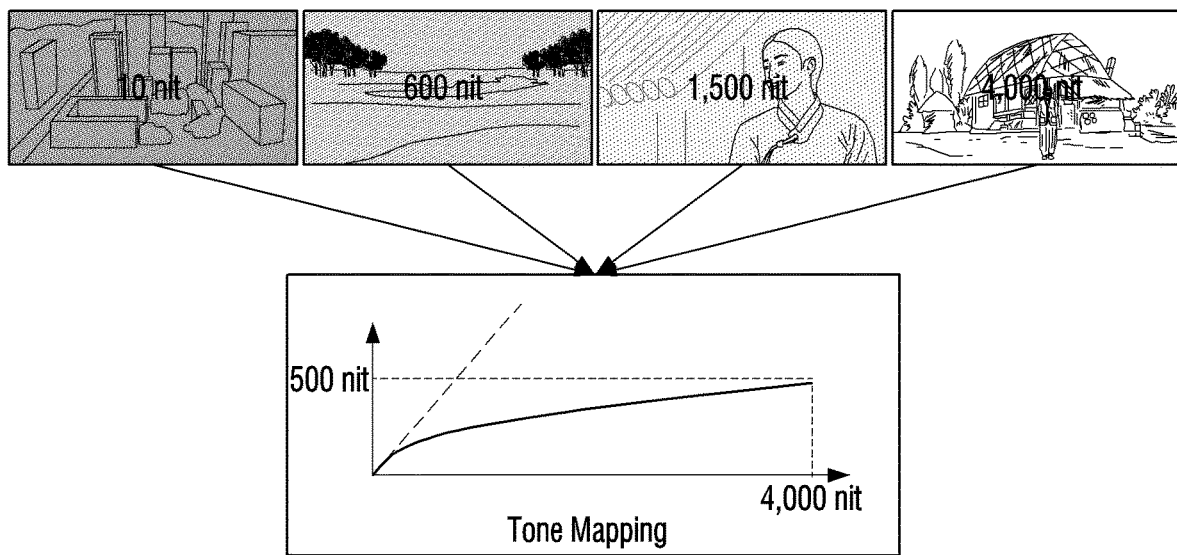
FIGS. 2A and 2B are views for describing a method of providing metadata according to an example embodiment of the present disclosure.

Meanwhile, according to an example, in a case in which the HDR content 10 and static metadata corresponding to the HDR content 10 are provided, the display apparatus 200 may apply the same tone mapping graph based on the static metadata to all the frames included in the HDR content 10 to perform image processing on the HDR content 10, as illustrated in FIG. 2A.

Figure 2B:
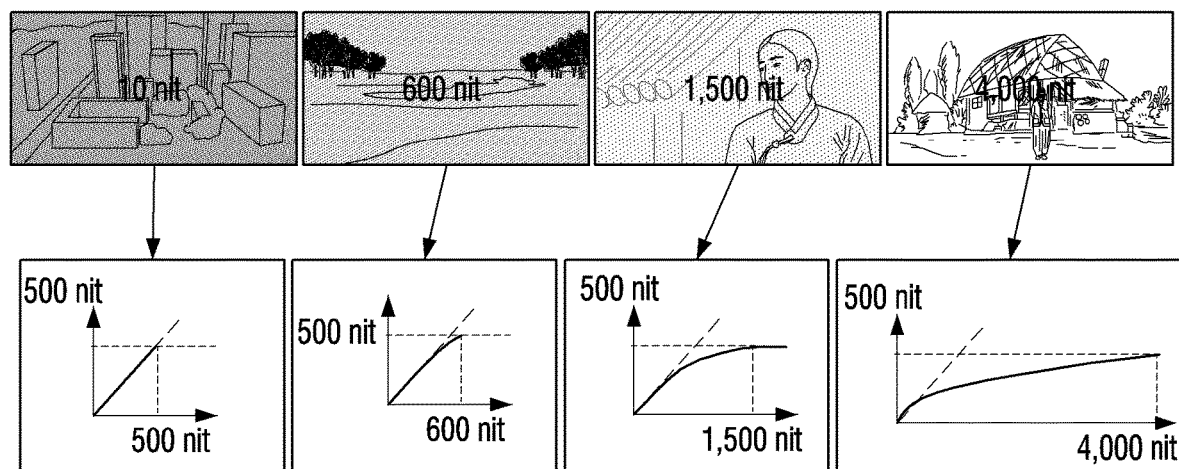

According to another example, in a case in which the HDR content 10 and dynamic metadata corresponding to each scene of the HDR content 10 are provided, the display apparatus 200 may apply different tone mapping graphs based on the dynamic metadata to each scene to perform image processing on the HDR content 10, as illustrated in FIG. 2B.

In a case in which the HDR content 10 and the dynamic metadata are provided according to the latter, there may be a case in which a graphic content such as a menu graphic is provided from the electronic apparatus 100 depending on a specific event during reproduction of the HDR content, that is, an HDR video content.

In this case, when a scene is changed during a period in which a menu graphic is displayed, different metadata corresponding to each scene are identically applied to the menu graphic, such that brightness, a color, and the like, of the same menu graphic are changed. The reason is that the electronic apparatus 100 renders (or blends) frames including video content and a menu graphic during a period in which the menu graphic is provided and provides the frames to the display apparatus 200 and the display apparatus 200 processes the frames including the video content and the menu graphic based on the dynamic metadata corresponding to the video content.

Hereinafter, various example embodiments will be described in which brightness and a color sense of graphic content may be maintained in a case in which the graphic content is provided during the reproduction of the dynamic HDR video content.

Figure 3A:
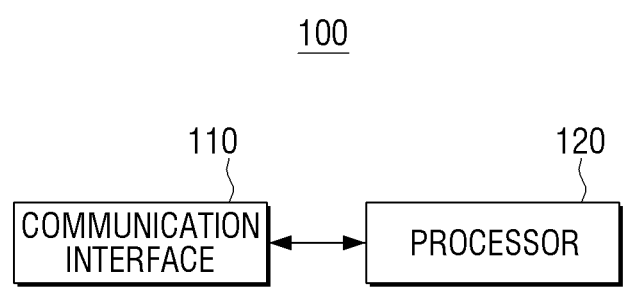
FIG. 3A is a block diagram illustrating components of an electronic apparatus according to an example embodiment of the present disclosure.

FIG. 3A is a block diagram illustrating components of an electronic apparatus according to an example embodiment of the present disclosure.

As illustrated in FIG. 3A, the electronic apparatus 100 includes a communication interface (e.g., including communication interface circuitry) 110 and a processor 120. The electronic apparatus 100 according to an example embodiment of the present disclosure may be implemented by a player device reproducing a content and providing the content to an external display apparatus 200 (see FIG. 1). For example, the electronic apparatus 100 may be implemented by an ultra high definition (UHD) Blu-ray player.

The communication interface 110 performs communication with the external display apparatus 200 (see FIG. 1).

According to an example, the communication interface 110 may be implemented by a high definition multimedia interface (HDMI) that may transmit high definition video and multi-channel digital audio by a single cable. For example, the communication interface 110 may include a transition minimized differential signaling (TMDS) channel for transmitting video and audio signals, a display data channel (DDC) for transmitting and receiving device information, video or audio related information (for example, enhanced extended display identification data (E-EDID)), and a consumer electronic control (CEC) for transmitting and receiving a control signal. However, the communication interface 110 is not limited thereto, and may be implemented by various interfaces depending on an implementation of the electronic apparatus 100. For example, the communication interface 110 may be implemented in a form that supports at least one of various types of digital interface communication, an access point-(AP) based wireless fidelity (Wi-Fi) (wireless local area network (LAN)) communication, Bluetooth communication, Zigbee communication, wired/wireless LAN communication, wide area network (WAN) communication, Ethernet communication, IEEE 1394 communication, HDMI communication, universal serial bus (USB) communication, mobile high-definition link (MHL) communication, advanced encryption standard (AES)/European broadcasting union (EBU) communication, optical communication, coaxial communication, and the like.

In addition, the electronic apparatus 100 may further include a separate communication interface (not illustrated) that may receive an image signal in a streaming or download manner from an external apparatus (for example, a source apparatus), an external storage medium (for example, a USB device), an external server (for example, a web server), or the like, through the various communication types described above.

According to an example embodiment, the communication interface 110 receives information on monitor performance of the display apparatus 200 and provides the received information to the processor 120, and outputs content provided from the processor 120 to the display apparatus 200.

The processor 120 controls a general and overall operation of the electronic apparatus 100.

According to an example embodiment, the processor 120 may be implemented by a digital signal processor (DSP), a microprocessor, or a time controller (TCON) processing a digital image signal. However, the processor 120 is not limited thereto, and may include one or more of a central processing unit (CPU), a micro controller unit (MCU), a micro processing unit (MPU), a controller, an application processor (AP), a communication processor (CP), an ARM processor, and the like. In addition, the processor 120 may be implemented by a system-on-chip (SoC) or a large scale integration (LSI) in which a processing algorithm is embedded, or may be implemented in the form of a field programmable gate array (FPGA).

The processor 120 reproduces input content, and provides the reproduced content together with information on the content to the display apparatus 200. For example, the input content may be HDR content encoded based on a specific video codec. Here, the video codec may be HEVC(H.265), AVC(H.264), MPEG 4, and MPEG 2, or the like, but is not limited thereto.

For example, the processor 120 decodes the input HDR content, and provides the decoded content together with corresponding metadata to the display apparatus 200. In particular, the processor 120 may provide dynamic metadata corresponding to each predetermined content period together with the HDR content to the display apparatus 200.

According to an example embodiment, the processor 120 may decode the HDR content recorded in a disc, map different metadata corresponding to image characteristics of each predetermined content period per predetermined content period of the HDR content, and then provide the different metadata to the display apparatus 200. Here, the predetermined content period may be, for example, a scene, which refers to a content period having a similar image quality. However, the predetermined content period is not limited thereto, and may, for example, be a frame. Here, the metadata corresponding to each predetermined content period may be metadata which reflects video (or image) characteristics of the corresponding content period, for example, a scene. As an example, the metadata may include at least one of color space information of the content, bit number information of the content, peak luminance information of the content, tone mapping information of the content, and mastering monitor information (for example, maximum brightness information).

Meanwhile, even though the processor 120 provides different metadata corresponding to each scene, transmission of the metadata may be performed in a frame unit. That is, when a plurality of frames of the same scene is provided to the display apparatus 200, the same metadata corresponding to this scene may be provided for each of the plurality of frames. For example, a case in which images and audio are transmitted using a TMDS channel and control signals are transmitted using a CES channel, according to an HDMI standard is assumed. In this case, the metadata may be provided to the display apparatus 200 through a data island period in which audio information and additional data information of TMDS are transmitted, that is, a blanking period in which vertical or horizontal synchronizing signals, or the like, exist. Alternatively, the processor 120 may store (or insert) the metadata in pixel data of a predetermined region (for example, at least one pixel line of at least one of an upper end region, a lower end region, a right region, and a left region) of each frame, and then provide the metadata to the display apparatus 200. For example, when HDR content is input in a form of a high efficiency video coding (HEVC) stream, the processor 120 may obtain dynamic metadata, that is, HDR content information and tone mapping information from a supplemental enhancement information (SEI) user data region of the HEVC stream through an HEVC decoder, map dynamic metadata corresponding to each scene to corresponding frames, and then transmit the dynamic metadata to the display apparatus 200.

However, the metadata are not limited thereto, but may also be transmitted through a separate signal line.

Meanwhile, according to an example embodiment of the present disclosure, when graphic content is activated, the processor 120 may provide metadata based on the graphic content to the display apparatus 200 during a period in which the graphic content is activated. As an example, the metadata based on the graphic content may be dynamic metadata corresponding to a specific content period in which the graphic content is initially activated or predetermined metadata corresponding to the graphic content. Here, the predetermined metadata corresponding to the graphic content may be at least one of static metadata of the graphic content and static metadata of the video content.

As another example, the metadata based on the graphic content may be metadata converted from the dynamic metadata based on the static metadata of at least one of the video content and the graphic content. According to an example embodiment, the processor 120 may replace at least some of brightness information of the content, tone mapping information, maximum brightness information of the mastering monitor, and RGB information of the content (for example, distribution_maxrgb_percentiles, Bezier_curve_anchors, targeted_system_display_maximum_luminance, average_maxrgb, and knee_point) included in the dynamic metadata corresponding to each content period with at least some of maximum brightness information of the content and maximum brightness information of the mastering monitor included in the static metadata and provide to the display apparatus 200 the dynamic metadata of which at least some metadata are replaced, during the period in which the graphic content is activated. According to another example embodiment, the processor 120 may obtain calculated values by calculating at least some of maximum brightness information of the content and maximum brightness information of the mastering monitor included in the static metadata according to a predetermined equation, and may replace at least some of brightness information of the content, tone mapping information, maximum brightness information of the mastering monitor, and RGB information of the content (for example, distribution_maxrgb_percentiles, Bezier_curve_anchors, targeted_system_display_maximum_luminance, average_maxrgb, and knee_point) included in the dynamic metadata corresponding to each content period with the obtained calculated values and transmit to the display apparatus 200 the dynamic metadata of which at least some metadata are replaced, during the period in which the graphic content is activated.

In addition, the processor 120 may provide to the display apparatus 200 graphic content of which a pixel value is converted (or corrected) based on the metadata corresponding to the video content during the period in which the graphic content is activated.

Here, the graphic content may include without limitation at least one of an interactive graphic (IG), a presentation graphic (PG), and a graphical user interface (GUI). IG can refer to graphic content that may be selected or controlled by a user, such as a main menu graphic, or the like, provided at a specific point in time (for example, an initial point in time of the content), and PG can refer to graphic content that is unilaterally viewed to the user in the content, such as subtitles, actor information, or the like. In addition, GUI can refer to a UI that is provided depending on a user command, such as a reproduction control menu, or the like. However, when subtitles are provided over the entire content, they may also not be processed as graphic content according to an example embodiment of the present disclosure.

The graphic content may be activated when an event such as input of a user command through the electronic apparatus 100 or the display apparatus 200 occurs or at a specific period (or frame) or a specific point in time in which the graphic content is automatically provided in the HDR content. In addition, an application programming interface (API) or a program included in the corresponding content in each content period may include information on whether or not graphic content is activated, and may identify whether or not graphic content is activated based on this information. For example, in the case of the Java Blu-ray disc (BD-J), the IG, the PG, and the like, may be provided through the Java application. In this case, the electronic apparatus 100 may not identify a point in time at which graphic content is activated. In this case, information for providing to the electronic apparatus 100 whether or not the corresponding graphic content is activated, a point in time in which the corresponding graphic content is activated, and the like, needs to be included in the content. For example, when information on whether or not graphic content is activated is included in content using a bit of a reserved region of the metadata, the processor 120 may identify the point in time in which the graphic content is activated based on this bit.

Meanwhile, since the GUI is a menu graphic provided by the electronic apparatus 100 depending on a user command, it may be different from the IG, the PG, or the like, in that the electronic apparatus 100 may identify a point in time at which the corresponding graphic content is provided.

For example, when graphic content is activated, the processor 120 may render (or blend) frames in which the graphic content is included in the video content, and provide the frames to the display apparatus 200. In this case, the processor 120 may also provide metadata based on the graphic content with respect to each of a plurality of frames belonging to the period in which the graphic content is activated.

According to an example embodiment, when the graphic content is activated in a specific content period, the processor 120 may provide metadata corresponding to the specific content period or predetermined metadata corresponding to the graphic content to the display apparatus 200 during the period in which the graphic content is activated.

In detail, when the graphic content is activated, the processor 120 may provide metadata based on the graphic content (or metadata related to the graphic content), rather than metadata corresponding to each scene of the video content to the display apparatus 200 during the period in which the graphic content is activated, for example, during at least one scene period (or frame period). Here, the metadata based on the graphic content may be metadata corresponding to video content of a scene in which the graphic content is initially activated or predetermined metadata based on characteristics of the graphic content. Here, the predetermined metadata may be, for example, graphic content dedicated metadata provided by the producer, static metadata corresponding to the graphic content, metadata converted from dynamic metadata corresponding to at least one period in which the graphic content is provided based on characteristics of the graphic content by the processor 120, metadata obtained by converting at least some of the dynamic metadata corresponding to at least one period in which the graphic content is provided, based on at least data of the static metadata of at least one of the video content and the graphic content by the processor 120, the static metadata corresponding to at least one of the video content and the graphic content, or the like. The reason why processing as described above is performed during the period in which the graphic content is activated is as follows.

When the display apparatus 200 processes the graphic content based on different dynamic metadata for each scene as described above, in a case in which the graphic content is provided over a plurality of scene periods, even though the graphic content is the same graphic content, there is a problem that brightness, a color, and the like, of the graphic content in each scene are changed. Therefore, the present disclosure can maintain brightness, a color sense, and the like, of a graphic content provided during a period in which a dynamic HDR content is provided even though a scene is changed. In addition, the present disclosure can sufficiently reflect an intention of a producer of a graphic content, that is, to maintain brightness and a color sense of a graphic content intended by the producer at the time of producing the graphic content. For example, in a case in which the graphic content is activated during a period in which a plurality of scenes is provided, when image processing is performed based on metadata of a scene in which the graphic content is initially provided during a period of the plurality of scenes, graphic content having a constant brightness and color may be provided to a user. The video content provided during the plurality of scenes may not be processed based on metadata matched to characteristics of the corresponding scenes due to the image processing as described above, which is ignored since content of interest of the user during a period in which the graphic content is provided is not the video content, but is the graphic content.

Likewise, when graphic content is processed based on predetermined static metadata during the period in which the plurality of scenes are provided, graphic content having a constant brightness and color may be provided to the user. For example, when static metadata corresponding to the HDR content or static metadata corresponding to the graphic content are provided from a content provider, the electronic apparatus 100 may provide the corresponding metadata instead of the dynamic metadata to the display apparatus 200 during the period in which the graphic content is activated.

According to another example embodiment, the processor 120 may convert the dynamic metadata of the video content based on the static metadata of at least one of the video content and the graphic content and provide the converted dynamic metadata to the display apparatus 200, during the period in which the graphic content is activated.

For example, the processor 120 may replace at least some of brightness information of the content, tone mapping information, maximum brightness information of the mastering monitor, and RGB information of the content (for example, distribution_maxrgb_percentiles, Bezier_curve_anchors, targeted_system_display_maximum_luminance, average_maxrgb, and knee_point) included in the dynamic metadata corresponding to each content period with at least some of maximum brightness information of the content and maximum brightness information of the mastering monitor included in the static metadata and provide to the display apparatus 200 the dynamic metadata of which at least some metadata are replaced, during the period in which the graphic content is activated.

According to another example embodiment, the processor 120 may obtain calculated values by calculating at least some of maximum brightness information of the content and maximum brightness information of the mastering monitor included in the static metadata of at least one of the video content and the graphic content according to a predetermined equation, and may convert the dynamic metadata of the video content based on the obtained calculated values and provide to the display apparatus 200 the converted dynamic metadata, during the period in which the graphic content is activated.

For example, the processor 120 may obtain calculated values by calculating at least some of maximum brightness information of the content and maximum brightness information of the mastering monitor included in the static metadata according to a predetermined equation, and may replace at least some of brightness information of the content, tone mapping information, maximum brightness information of the mastering monitor, and RGB information of the content (for example, distribution_maxrgb_percentiles, Bezier_curve_anchors, targeted_system_display_maximum_luminance, average_maxrgb, and knee_point) included in the dynamic metadata corresponding to each content period with the obtained calculated values and transmit to the display apparatus 200 the dynamic metadata of which at least some metadata are replaced, during the period in which the graphic content is activated.

According to still another example embodiment, the processor 120 may convert the dynamic metadata corresponding to the video content based on characteristics of the graphic content in various manners, and then provide the converted metadata to the display apparatus 200, during the period in which the graphic content is activated.

According to yet still another example embodiment, the processor 120 may provide graphic content converted to be processable in the display apparatus 200 based on the dynamic metadata corresponding to the video content to the display apparatus 200 during the period in which the graphic content is activated.

In detail, the processor 120 may change at least one of a pixel value and a brightness value of the graphic content based on the dynamic metadata corresponding to the video content, and provide to the display apparatus 200 the graphic content of which at least one of the pixel value and the brightness value is changed, during the period in which the graphic content is activated. That is, the processor 120 may change at least one of the pixel value and the brightness value of the graphic content provided in each scene period so that brightness, a color, and the like, of the graphic content are not changed even though image processing is performed on the graphic content by dynamic metadata of each scene in the display apparatus 200, and provide to the display apparatus 200 the graphic content of which at least one of the pixel value and the brightness value is changed.

According to yet still another example embodiment, the processor 120 may allow information indicating whether or not the graphic content is activated to be included in at least one of the dynamic metadata of the video content, the static metadata of the video content and the static metadata of the graphic content, and provide the information to the display apparatus 200. In this case, the display apparatus 200 may process the frames based on the dynamic metadata in a period in which the graphic content is inactivated and process the frames based on the static metadata in the period in which the graphic content is activated, based on the information indicating whether or not the graphic content is activated.

According to yet still another example embodiment, the graphic content may also be processed by a combination of two or more of the abovementioned example embodiments. For example, the processor 120 may appropriately change the pixel value of the graphic content while converting the metadata corresponding to the video content based on characteristics of the graphic content, and provide to the display apparatus 200 the converted metadata and the graphic content of which the pixel value is changed, during the period in which the graphic content is activated.

Figure 3B:
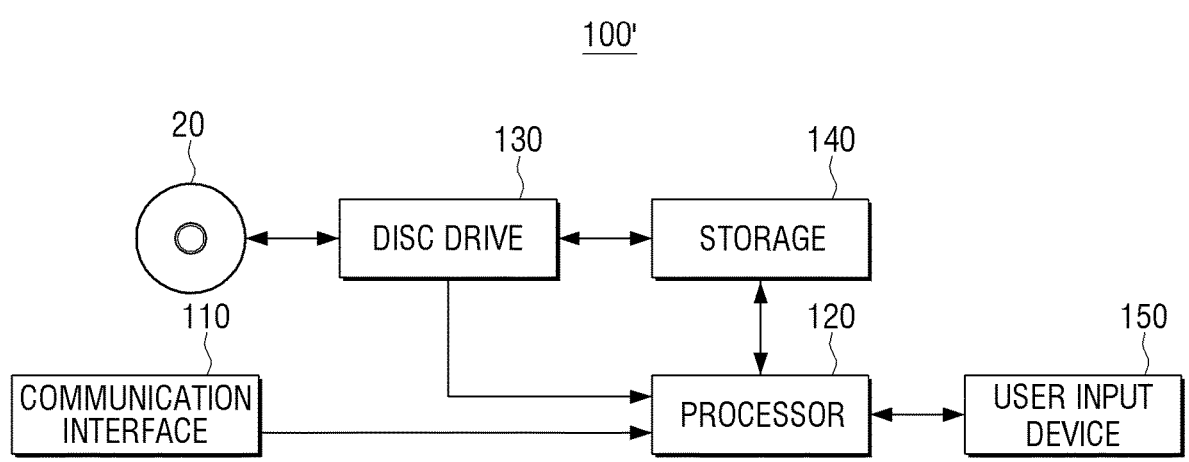
FIG. 3B is a view illustrating an implementation of the example electronic apparatus illustrated in FIG. 3A.

FIG. 3B is a view illustrating a non-limiting example implementation of the electronic apparatus illustrated in FIG. 3A.

As illustrated in FIG. 3B, an electronic apparatus 100' according to an example embodiment of the present disclosure may include the communication interface 110, the processor 120, a disc drive 130, a storage 140, and a user input 150. A detailed description will be omitted for those components in FIG. 3B having corresponding components in FIG. 3A.

The processor 120 is, for example, implemented by a central processing unit (CPU), a read only memory (ROM), a random access memory (RAM), a graphic engine, a decode, a scaler, and the like. In addition, the processor 120 may also be implemented in a form in which an audio DSP for processing audio signals is embedded.

The disc drive 130 reads data from the optical disc 20, and outputs the read data to at least one of the processor 120, the communication interface 110, and the storage 140. For example, the disc drive 130 may be implemented by a Blu-ray disc (BD)-ROM drive, a BD combo drive, or the like.

The storage 140 stores data required for the processor 120 to execute various processing. As an example, the storage 140 may be implemented by an internal memory such as a ROM, a RAM, or the like, included in the processor 120 or may be implemented by a memory separate from the processor 120. In this case, the storage 140 may be implemented in a form of a memory embedded in the electronic apparatus 100 or a form of a memory attachable to and detachable from the electronic apparatus 100, depending on a data storing purpose. For example, data for driving the electronic apparatus 100 may be stored in the memory embedded in the electronic apparatus 100, and data for an extension function of the electronic apparatus 100 may be stored in a memory attachable to and detachable from the electronic apparatus 100. Meanwhile, the memory embedded in the electronic apparatus 100 may be implemented in a form such as a non-volatile memory, a volatile memory, a flash memory, a hard disc drive (HDD), a solid state drive (SDD), or the like, and the memory attachable to and detachable from the electronic apparatus 100 may be implemented in a form such as a memory card (for example, a micro secure digital (SD) card, a USB memory, or the like), an external memory (for example, a USB memory) connectable to a USB port, or the like.

The user input device (e.g., including user input device circuitry) 150 may include at least one of a button, a key, a touch panel, and a remote controller signal receiver for receiving a remote control signal from a remote controller.

Meanwhile, the processor 120 decodes video content supplied from the disc drive 130, and provides HDR content, SDR content, UHD content, and the like, to the communication interface 110. In particular, the processor 120 may decode HDR content, and provide dynamic metadata to the display apparatus 200 in synchronization with each frame. In addition, the processor 120 may perform various functions based on characteristics of input content. For example, in a case in which the display apparatus 200 is identified to be an SDR television (TV) based on information (for example, EDID information of an HDMI interface) received from the display apparatus 200 connected to the electronic apparatus 100, the processor 120 converts the input HDR content into the SDR content, and provides the SDR content.

Figure 4:
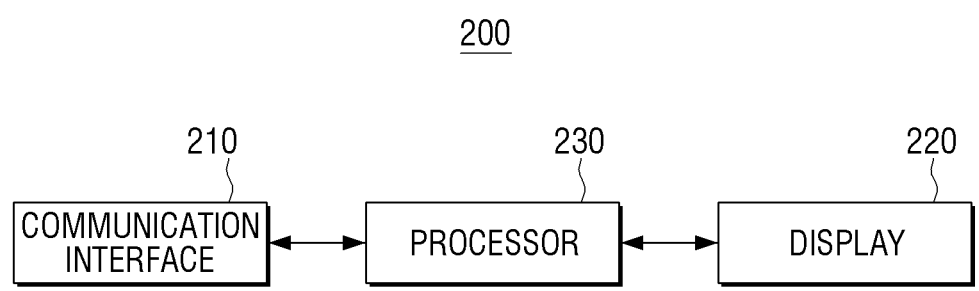
FIG. 4 is a block diagram illustrating components of a display apparatus according to an example embodiment of the present disclosure.

FIG. 4 is a block diagram illustrating components of a display apparatus according to an example embodiment of the present disclosure.

As illustrated in FIG. 4, the display apparatus 200 includes a communication interface (e.g., including communication interface circuitry) 210, a display 220, and a processor 230.

The communication interface 210 performs communication with an external electronic apparatus 100 (see FIG. 1).

The communication interface 210 may be implemented by an HDMI interface that may transmit high definition video and multi-channel digital audio by a single cable. For example, the communication interface 210 may include a TMDS channel for transmitting video and audio signals, a display data channel (DDC) for transmitting and receiving device information, video or audio related information (for example, E-EDID), and a CEC for transmitting and receiving a control signal. However, the communication interface 210 is not limited thereto, and may be implemented by various interfaces depending on an implementation of the display apparatus 200. For example, the communication interface 210 may be implemented in a form that supports at least one of various types of digital interface communication, AP based Wi-F) (wireless LAN) communication, Bluetooth communication, Zigbee communication, wired/wireless LAN communication, WAN communication, Ethernet communication, IEEE 1394 communication, HDMI communication, universal serial bus (USB) communication, MHL communication, AES/EBU communication, optical communication, coaxial communication, and the like.

According to an example embodiment, the communication interface 210 may provide information on monitor performance of the display apparatus 200 to the electronic apparatus 100, and receive the content provided from the electronic apparatus 100.

The display 220 may be implemented in various forms such as a liquid crystal display (LCD), an organic light emitting diode (OLED), a light emitting diode (LED), liquid crystal on silicon (LCoS), digital light processing (DLP), quantum dot (QD) display panel, and the like.

The processor 230 controls a general and overall operation of the display apparatus 200. Since an implementation form of the processor 230 is the same as or similar to that of the processor 120 of the electronic apparatus 100, a detailed description thereof is omitted.

According to an example embodiment, when video content and dynamic metadata corresponding to each predetermined content period are received from the electronic apparatus 100 from the communication interface 210, the processor 230 process the video content based on the dynamic metadata. In addition, the processor 230 controls the display 220 to display the processed video content.

In particular, when graphic content is activated, the processor 230 may process video content and graphic content based on metadata corresponding to the graphic content during at least one period in which the graphic content is activated. Here, the metadata corresponding to the graphic content may be metadata corresponding to a specific video content period in which the graphic content is activated, graphic content dedicated metadata (for example, static metadata corresponding to the graphic content) provided by a graphic content producer, metadata (for example, static metadata corresponding to the video content and the graphic content) provided by the graphic content producer, metadata converted from dynamic metadata corresponding to at least one period in which the graphic content is provided, based on characteristics of the graphic content by the electronic apparatus 200, metadata converted from dynamic metadata corresponding to at least one period in which the graphic content is provided, based on static metadata of at least one of the video content and the graphic content, or the like. Since a detailed example of the metadata is the same as the metadata transmitted from the electronic apparatus 100, a more detailed description thereof is omitted.

For example, when the electronic apparatus 100 identifies and transmits metadata based on graphic content during the period in which the graphic content is activated, the processor 230 processes the video content and the graphic content without distinguishing the video content and the graphic content from each other, based on the metadata received in the corresponding content period. Therefore, the graphic content may be provided at a constant brightness and color sense, but the video content may not be processed based on the corresponding dynamic metadata, such that video content in which an intention of the video content producer is reflected may not be provided during the period in which the graphic content is activated. This aspect can be ignored in the present disclosure since a content of interest of the user in the corresponding period is not the video content, but is the graphic content. Meanwhile, the reason why the processor 230 may not separately process the graphic content is that the electronic apparatus 100 renders (or blends) the frames including the graphic content and the video content and provides the frames to the display apparatus 200, as described above with reference to FIG. 1.

Meanwhile, in a case in which metadata based on graphic content are provided from the electronic apparatus 100 during the content period in which the graphic content is provided, the display apparatus 200 passively processes the content only based on the provided metadata. That is, the display apparatus 200 may not identify whether or not the graphic content is activated, and processes the content based on the metadata transmitted from the electronic apparatus 100 without depending on identification of whether or not graphic content is activated.

However, according to another example embodiment, the display apparatus 200 may also directly identify whether or not graphic content is activated, and process the content. For example, the electronic apparatus 100 may allow information indicating whether or not the graphic content is activated to be included in the dynamic metadata of the video content or the static metadata of at least one of the video content and the graphic content, and provide the information to the display apparatus 200. In this case, the display apparatus 200 may process the frames based on the dynamic metadata in a period in which the graphic content is inactivated and process the frames based on the static metadata in the period in which the graphic content is activated, based on the information indicating whether or not the graphic content is activated.

According to still another example embodiment, the display apparatus 200 may actively analyze characteristics of the video content including the graphic content, and perform image processing on video frames including the graphic content based on the analyzed characteristics.

In detail, the display apparatus 200 directly identifies metadata to be applied during a period in which graphic content is activated, or needs to identify whether or not the graphic content is activated in a case in which image processing depending on characteristics of the graphic content is performed. Also in this case, the display apparatus 200 receives content in which the video content and the graphic content are rendered (or blended) from the electronic apparatus 100, the display apparatus 200 does not identify and process only the graphic content, but performs the same image processing on the content input in the corresponding period. For example, when the electronic apparatus 100 provides dynamic metadata corresponding to video content during a period in which graphic content is activated, the display apparatus 200 may process the video content and the graphic content input during the period in which the graphic content is activated, using pre-stored separate metadata, rather than the dynamic metadata input during the period in which the graphic content is activated.

In this case, the processor 230 may identify a point in time at which graphic content is activated based on information provided from the electronic apparatus 100. As an example, a specific bit of a specific region of the metadata provided from the electronic apparatus 100 may indicate the corresponding information. For example, the information on whether or not graphic content is activated may be included by allocating at least one bit to a reserved region of the dynamic metadata provided from the electronic apparatus 100. The information on whether or not the graphic content is activated may be added to the dynamic metadata by the content producer (for example, the IG, the PG, or the like, described above) or may be added to the dynamic metadata by the electronic apparatus 100 (for example, the GUI, or the like, provided depending on a user command as described above).

FIGS. 5A and 5B illustrate various implementations of dynamic metadata according to an example embodiment of the present disclosure.

According to an example embodiment of the present disclosure, dynamic metadata may be implemented in a form defined in ST.2094-40, which is an open standard for HDR image technology, as illustrated in FIG. 5A.

According to another example embodiment of the present disclosure, dynamic metadata may be implemented in a form as illustrated in FIG. 5B or in other forms.

Figure 6A:
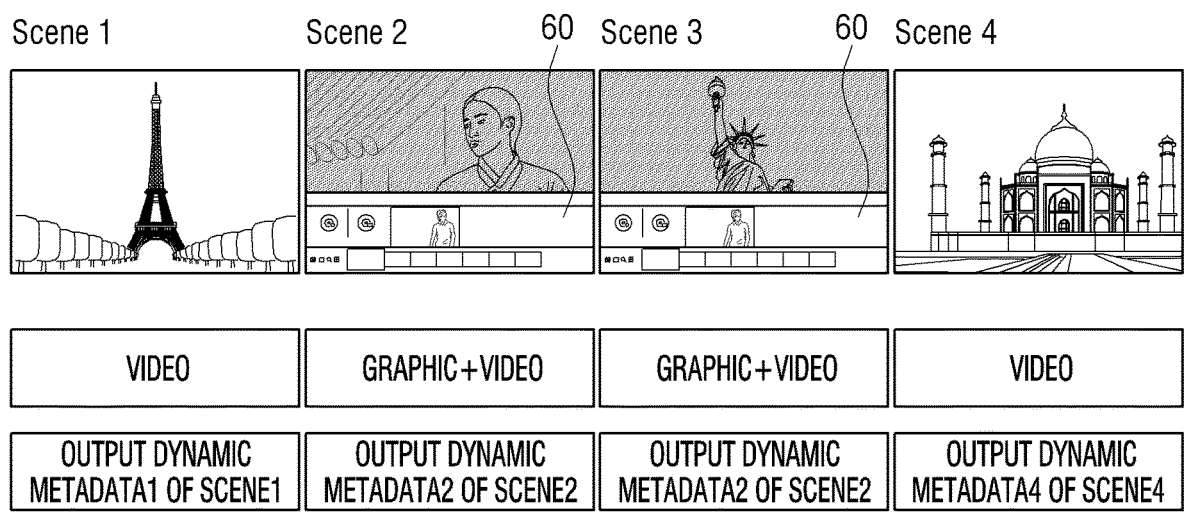
FIGS. 6A and 6B are views for describing a method of processing a graphic content according to an example embodiment of the present disclosure.
Figure 6B:
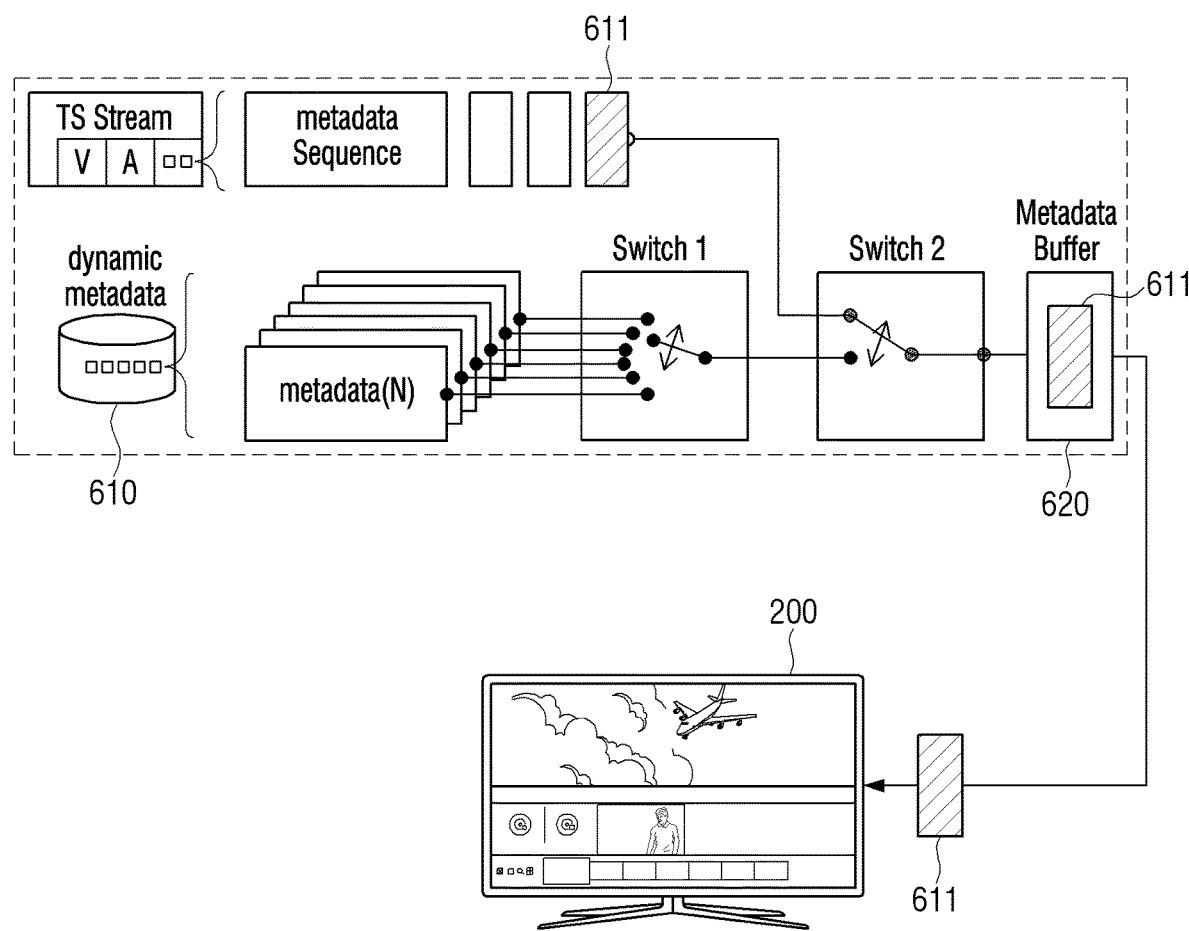

FIGS. 6A and 6B are views illustrating a method of processing graphic content according to an example embodiment of the present disclosure.

As illustrated in FIG. 6A, a case is assumed in which Scene 1, Scene 2, Scene 3, and Scene 4 of video content are sequentially reproduced and in which graphic content is provided in periods of Scene 2 and Scene 3.

According to the related art, the electronic apparatus 100 provides dynamic metadata 1, metadata 2, metadata 3, and metadata 4 corresponding to each scene to the display apparatus 200 during a period in which Scene 1, Scene 2, Scene 3, and Scene 4 are sequentially reproduced. In this case, even though graphic content provided in the periods of Scene 2 and Scene 3 are the same graphic content, there is a problem that they are provided at different brightness and color senses in each of the periods of Scene 2 and Scene 3.

However, according to an example embodiment of the present disclosure, as illustrated in FIG. 6A, when a graphic content 60 is provided in the periods of Scene 2 and Scene 3, the electronic apparatus 100 may identically provide metadata (dynamic metadata 2) of Scene 2 in which the graphic content 60 is initially provided over all the periods in which the graphic content 60 is provided, that is, the periods of Scene 2 and Scene 3. In this case, the display apparatus 200 processes frames based on the same metadata (dynamic metadata 2) during a period in which Scene 2 and Scene 3 are displayed, and brightness and a color sense of the graphic content 60 may thus be maintained.

FIG. 6B is a detailed view for describing operations of the electronic apparatus 100 for implementing an example embodiment illustrated in FIG. 6A.

As illustrated in FIG. 6B, the electronic apparatus 100 may select metadata corresponding to each content period from a dynamic metadata set and provide the selected metadata to a metadata buffer 620 in a content period in which graphic content is not provided (operation of Switch 1).

However, the electronic apparatus 100 may select the latest transmitted metadata and provide the latest transmitted metadata to the metadata buffer 620 as the metadata 611 in a period in which graphic content is activated (operation of Switch 2).

FIGS. 7A to 7H are views for describing a method of processing a graphic content according to another example embodiment of the present disclosure.

Figure 7A:
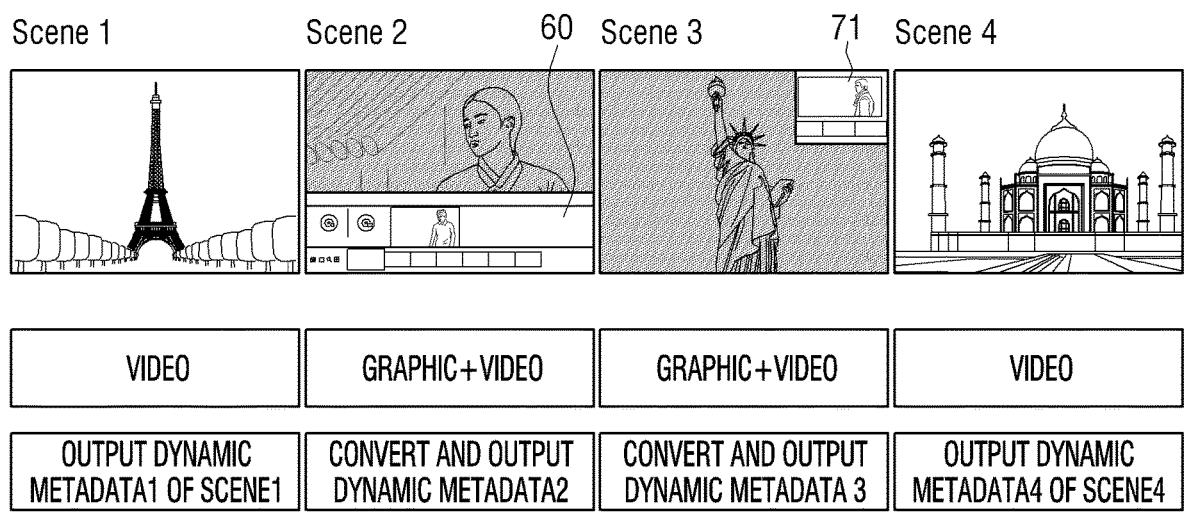

In FIG. 7A, a case is assumed in which Scene 1, Scene 2, Scene 3, and Scene 4 of video content are sequentially reproduced and in which different graphic content is provided in periods of Scene 2 and Scene 3.

According to another example embodiment of the present disclosure, as illustrated in FIG. 7A, when first and second graphic content 60 and 71 are provided in periods of Scene 2 and Scene 3, the electronic apparatus 100 may convert dynamic metadata of video content provided in the periods of Scene 2 and Scene 3 based on static metadata of at least one of the video content and the graphic content, and then provide the converted dynamic metadata to the display apparatus 200.

For example, the electronic apparatus 100 may provide the dynamic metadata converted (or replaced) from dynamic metadata 2 and dynamic metadata 3 each corresponding to periods of Scene 2 and Scene 3 based on the static metadata of the video contents and the graphic contents over all the periods in which the graphic content 60 and 71 are provided, that is, in the periods of Scene 2 and Scene 3, as illustrated in FIG. 7A. Here, the dynamic metadata converted based on the static metadata may be metadata of which at least some the dynamic metadata are replaced with at least some of the static metadata, while a format of the dynamic metadata is maintained. In addition, a phrase "convert (replace or substitute) the dynamic metadata based on the static metadata" may include a case of replacing at least some of the dynamic metadata with calculated data obtained by calculating at least some of the static metadata through a predetermined calculation (or calculation equation), as well as a case of simply replacing at least some of the dynamic metadata with at least some of the static metadata.

In addition, the static metadata of the video content and the graphic content may be metadata produced by a producer so that both of characteristics of the video content and the graphic content in a period of a corresponding scene are reflected. However, the electronic apparatus 100 is not limited thereto, and may also provide the dynamic metadata converted from dynamic metadata 2 and dynamic metadata 3 based on the static metadata of the video content or the static metadata of the graphic content in the periods of Scene 2 and Scene 3.

In this case, the display apparatus 200 processes frames based on dynamic metadata converted based on static metadata during a period in which Scene 2 and Scene 3 are displayed, and brightness and a color sense of the graphic contents 60 and 71 intended by a producer may thus be maintained.

Figure 7B:
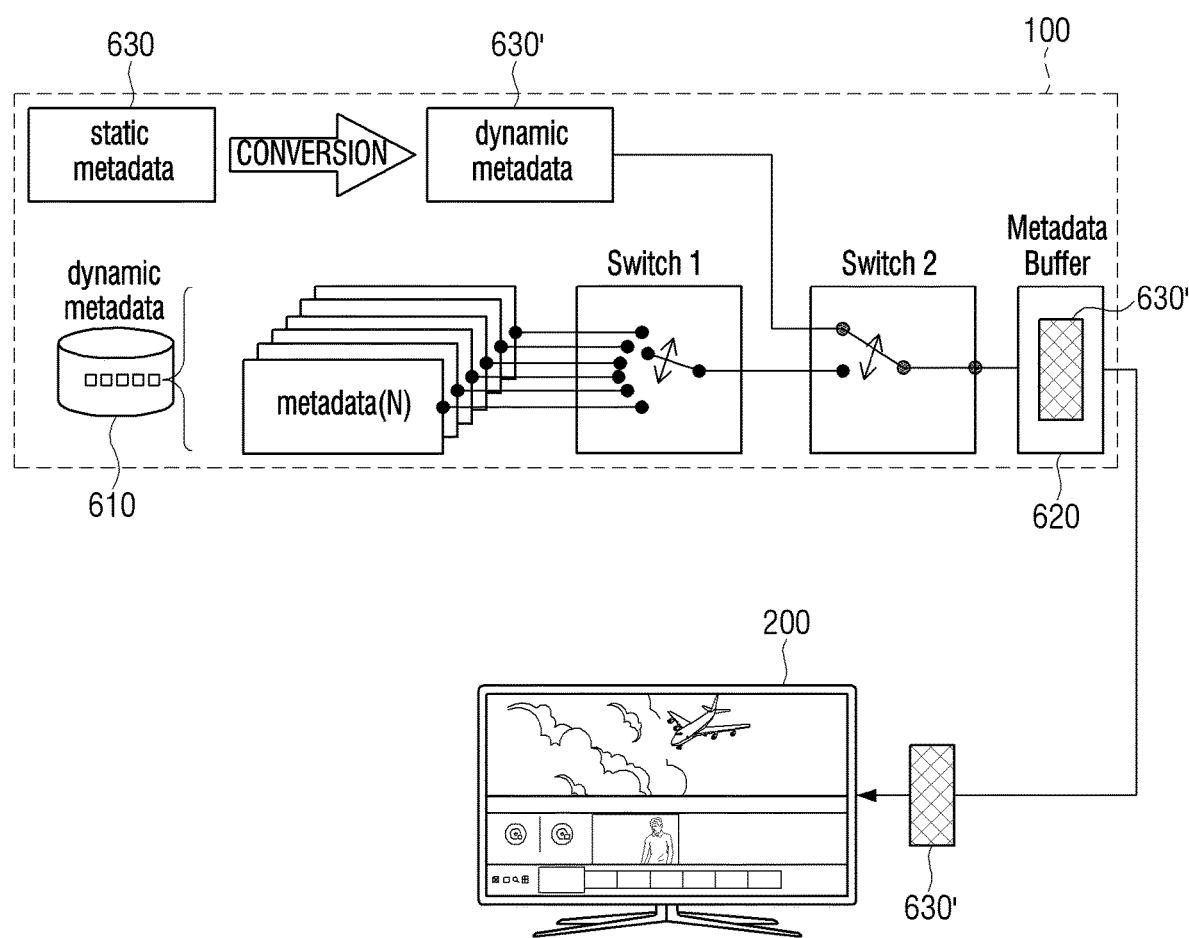

FIG. 7B is a view for illustrating operations of the electronic apparatus 100 for implementing an example embodiment illustrated in FIG. 7A in detail.

As illustrated in FIG. 7B, the electronic apparatus 100 may select dynamic metadata corresponding to each content period from a dynamic metadata set and provide the selected dynamic metadata to a metadata buffer 620 in a content period in which the graphic content is not provided (operation of switch 1).

However, the electronic apparatus 100 may select dynamic metadata 630' converted from dynamic metadata 630 of video content based on static metadata, and provide the dynamic metadata 630' to the metadata buffer 620 (operation of switch 2).

FIGS. 7C to 7H are views for describing various example embodiments of obtaining metadata based on a graphic content.

As illustrated in FIGS. 7C to 7H, metadata corresponding to graphic content may be obtained by converting (or calculating or processing) at least some (or some data values) of static metadata of at least one of video content and graphic content or metadata for graphic content may be obtained based on at least some of the static metadata of at least one of the video content and the graphic content and dynamic metadata of the video content.

As an example, converted (or calculated or processed) dynamic metadata may be obtained by replacing (or calculating) at least some of the dynamic metadata of video content with at least some data values of static metadata of at least one of the video content and the graphic content. As another example, converted (or calculated or processed) dynamic metadata may be obtained by converting (calculating or processing) at least some data value of static metadata and then replacing (or calculating) at least some of the dynamic metadata of video content with the converted (or calculated or processed) data values.

As illustrated in FIG. 7C, the electronic apparatus 100 may replace (or calculate) brightness information of content, brightness information (for example, the highest brightness information) of a monitoring monitor, tone mapping information, and RGB information (for example, the highest RGB information) included in dynamic metadata 720 of video content with the highest brightness information of the graphic content or the highest brightness information of the monitoring monitor of static metadata 710 to generate converted (calculated or processed) dynamic metadata. For example, the electronic apparatus 100 may replace (or calculate) at least some of distribution_maxrgb_percentiles@99.98% 722, targeted_system_display_maximum_luminance 721, Bezier_curve_anchors, and knee_point, average_maxrgb according to an ST.2086 standard with Maximum Content Light Level 711 or max_display_mastering_luminance of static metadata 710 according to the ST.2086 standard to generate converted (calculated or processed) meta data. In this case, the display apparatus 200 may recognize, in advance, what information a bit value of a replaced position indicates, or the electronic apparatus may allow the corresponding information to be included to a specific bit region of the dynamic metadata, and then transmit the information included in the specific bit region. For example, in a case in which distribution_maxrgb_percentiles @99.98% 722 is replaced with a value of Maximum Content Light Level 711, the display apparatus 200 may recognize, in advance, that data of Maximum Content Light Level 711 are included in a region to which distribution_maxrgb_percentiles @99.98% 722 is allocated or the corresponding information may be included in a reserved region 70 of a specific bit region (see, for example, FIGS. 7C to 7H) of the dynamic metadata.

Figure 7D:
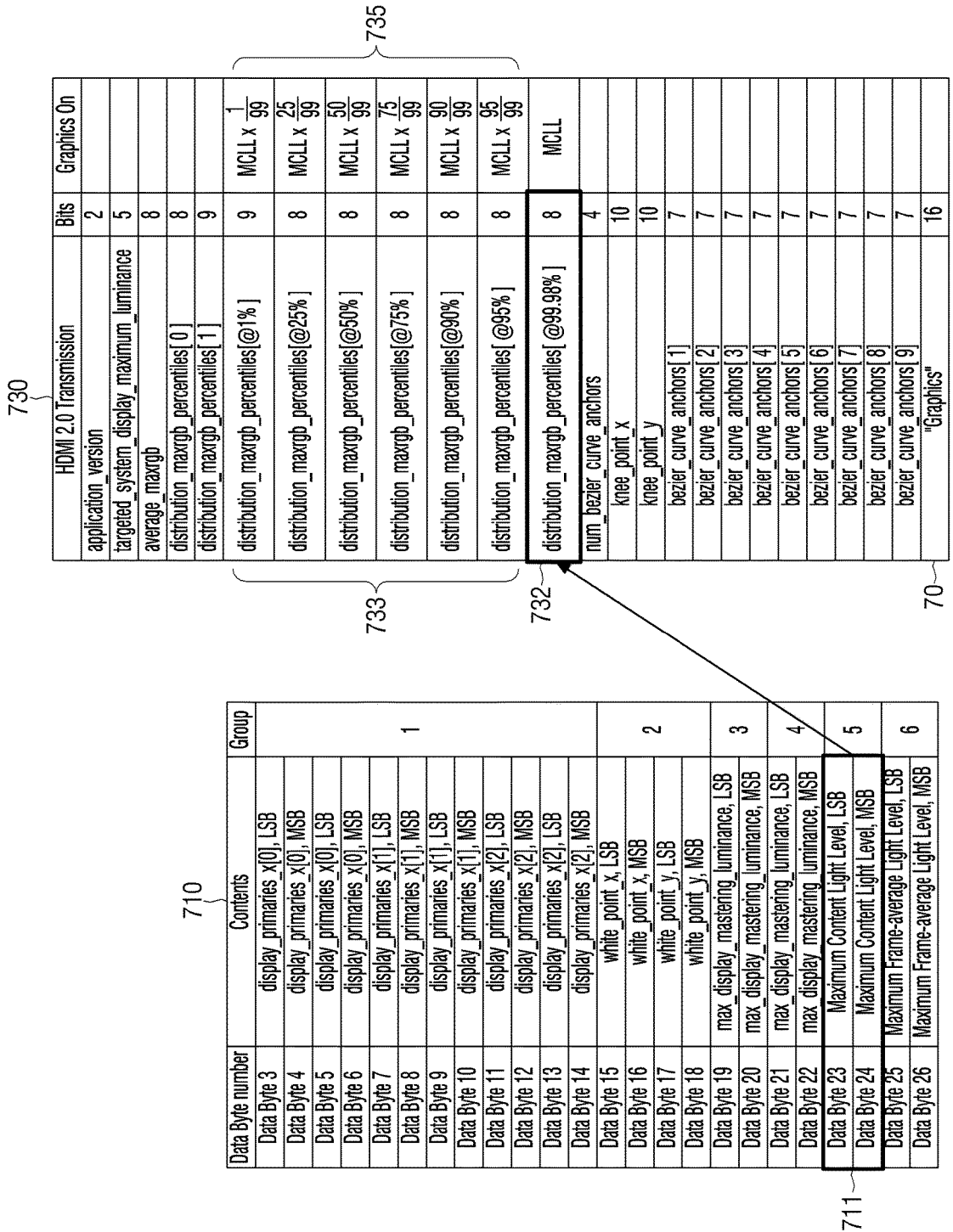

According to another example embodiment illustrated in FIG. 7D, the electronic apparatus 100 may replace (or calculate) the highest brightness information (for example, distribution_maxrgb_percentiles@99.98%) 732) of content of dynamic metadata 730 of a video content with the highest brightness information (for example, Maximum Content Light Level 711) of the content of static metadata 710 to generate converted meta data. In this case, the remaining distribution_maxrgb_percentiles data 733 may be replaced with 0 so as not to be used in the display apparatus 200, or may be converted into and replaced with corresponding percentile brightness values based on Maximum Content Light Level 711 of the replaced static metadata 710. For example, as illustrated in FIG. 7D, in a case in which distribution_maxrgb_percentiles@99.98%) 732 of the dynamic metadata 730 is replaced with a value of Maximum Content Light Level (MCLL), distribution_maxrgb_percentiles@95%) of the dynamic metadata 730 may be replaced with a value of MCLL*95/99 (or MCLL*95/99.98), and the remaining distribution_maxrgb_percentiles values may be replaced with percentile brightness conversion values 735 calculated in the same manner.

Figure 7E:
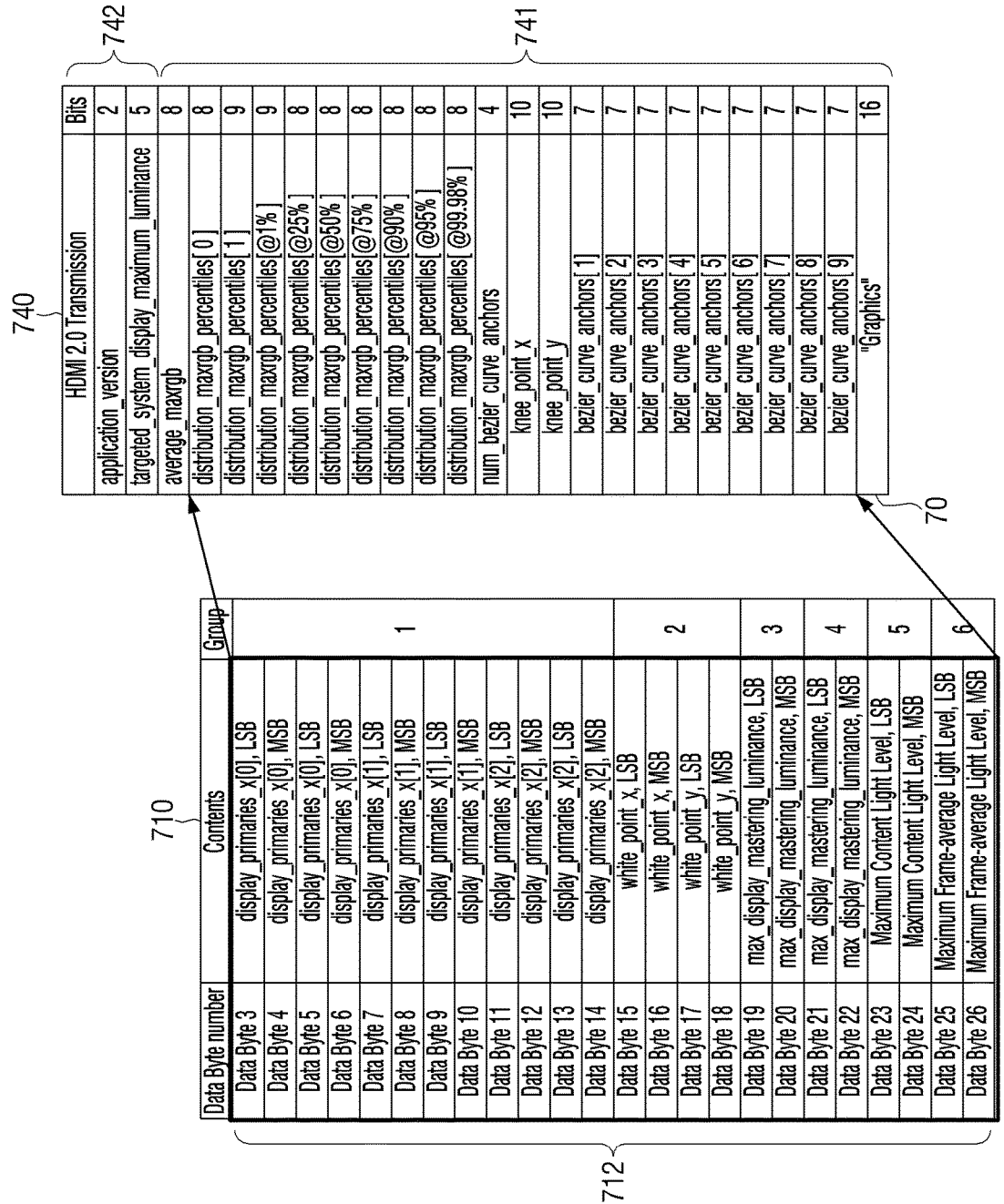
Figure 7F:
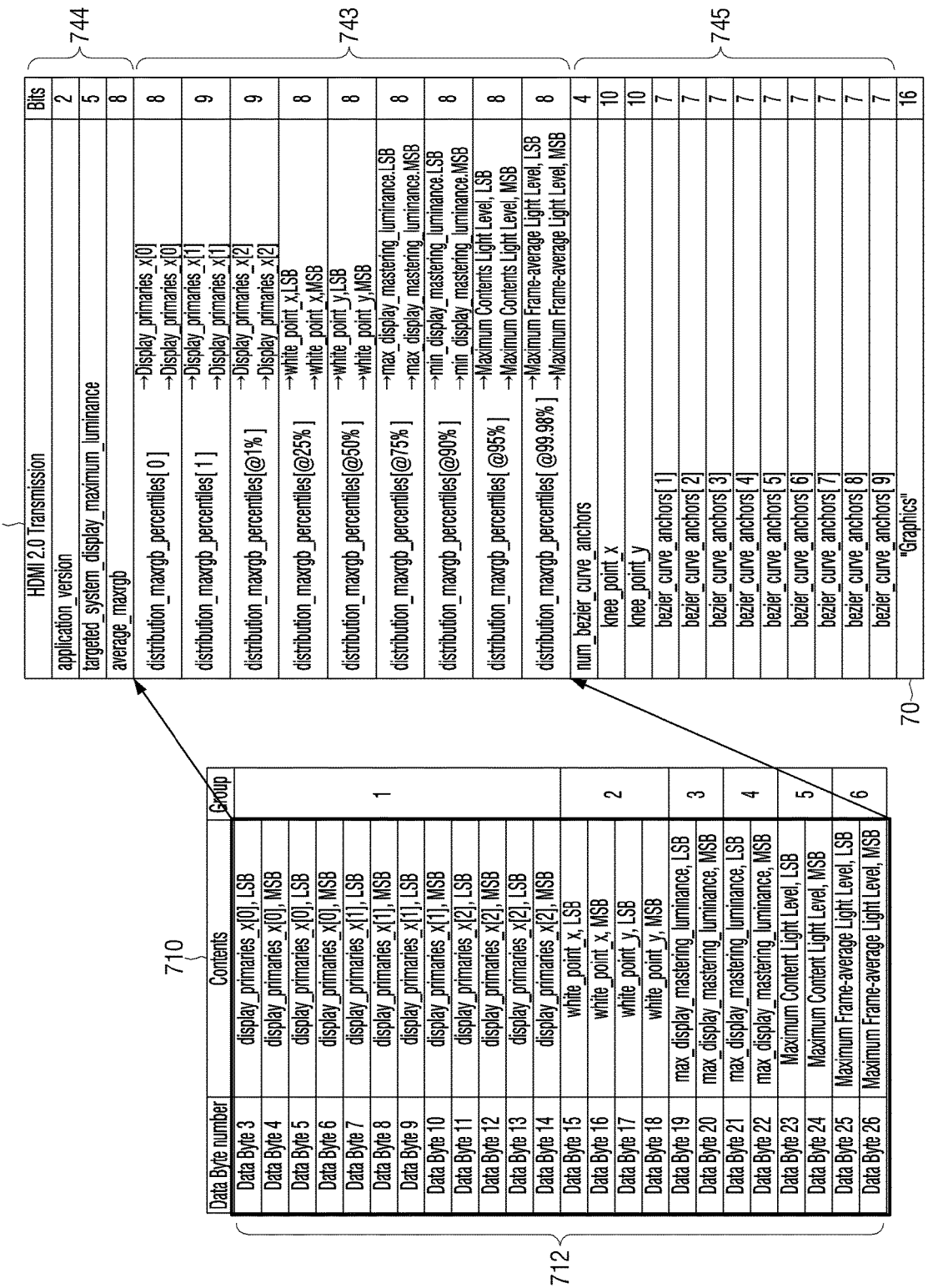

According to still another example embodiment illustrated in FIG. 7E, the electronic apparatus 100 may replace brightness information of content and tone mapping information 741 of dynamic metadata 740 of video content with all information of the static metadata 710 to generate converted metadata. In this case, format information 742 of the dynamic metadata 740 is maintained, and dynamic metadata of which only data values are replaced with data values of the static metadata 710 may thus be obtained. In this case, as illustrated in FIG. 7F, it is possible to lower a representation method of RGB primary values of the static metadata 710 from 16 bits to 8 bits and then replace some regions 743 of the dynamic metadata, if necessary.

A case in which targeted_system_display_maximum_luminance of the dynamic metadata 740 is maintained in the dynamic metadata 740 without being replaced is illustrated in FIG. 7E, but targeted_system_display_maximum_luminance may also be replaced with a data value of the static metadata 710. In this case, the display apparatus 200 may recognize, in advance, what information a bit value of a replaced position indicates, or the electronic apparatus 100 may allow the corresponding information to be included to a specific bit region of the dynamic metadata, and then transmit the information included in the specific bit region.

According to yet still another example embodiment illustrated in FIG. 7G, the electronic apparatus 100 may obtain calculated values by calculating at least some of maximum brightness information 711 of content and/or maximum brightness information 713 of a mastering monitor included in the static metadata 710 based on a predetermined equation (or calculation method), and replace at least some of brightness information of a content, tone mapping information, maximum brightness information of a mastering monitor, and RGB information of the content included in dynamic metadata 750 with the obtained calculated values to obtain dynamic metadata. For example, in a case in which a value of Maximum Content Light Level (MCLL) 711 of the static metadata 710 is used, when it is assumed that the value of the MCLL, that is, Lmax_2086 is 4000, the electronic apparatus 100 does not use a value of 4000 as it is, but may obtain a value of 40000 according to a predetermined calculation equation, for example, 4000*10=40000, and replace a value of distribution_maxrgb_percentiles@99.98%) of the dynamic metadata 750 with the obtained value. In this case, the remaining percentile brightness values may also be replaced with calculated values depending on corresponding %. For example, a value of distribution_maxrgb_percentiles@95%) may be replaced with 40000*95/99 (or 4000*95/99)=38380. However, as illustrated in FIG. 7H, more or fewer brightness steps than the number of percentage brightness steps included originally in the dynamic metadata 750 may be replaced in dynamic metadata 750.

Figure 8A:
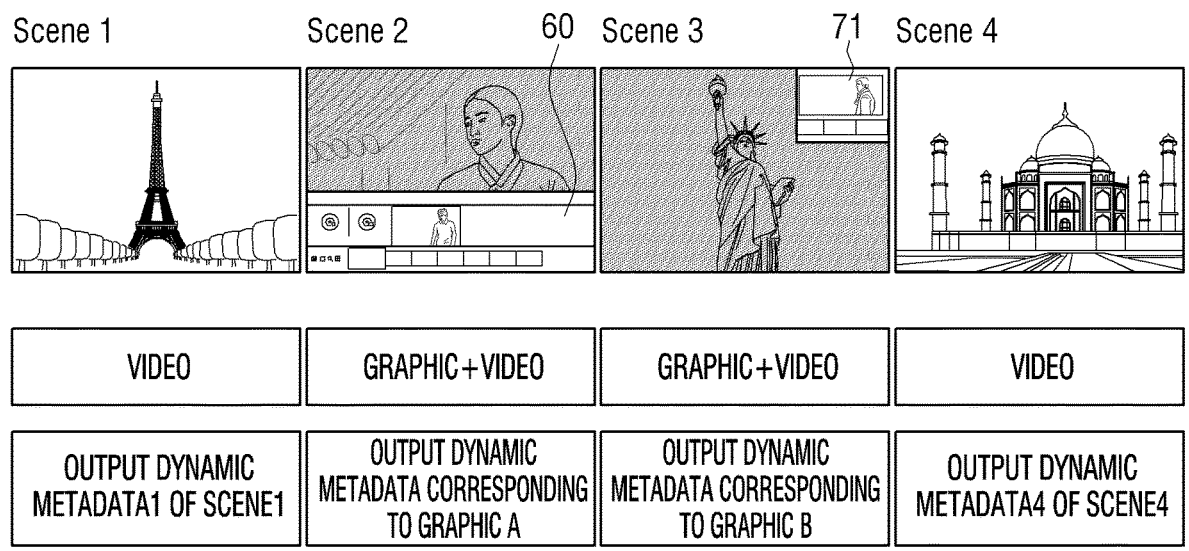
FIGS. 8A and 8B are views for describing a method of processing a graphic content according to still another example embodiment of the present disclosure.
Figure 8B:
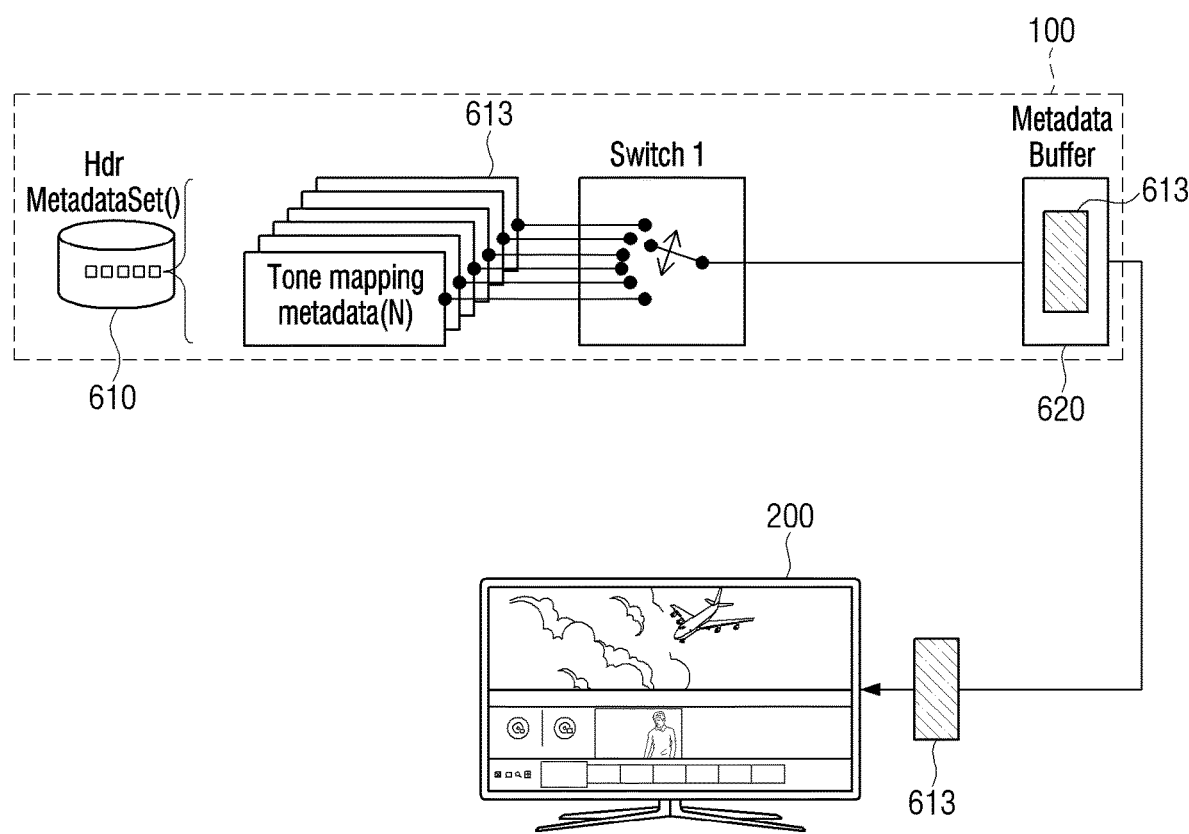

FIGS. 8A and 8B are views for describing a method of processing a graphic content according to still another example embodiment of the present disclosure.

In FIG. 8A, a case is assumed (as in FIG. 7A) in which Scene 1, Scene 2, Scene 3, and Scene 4 of video content are sequentially reproduced and in which different graphic contents 60 and 71 are provided in periods of Scene 2 and Scene 3.

As illustrated in FIG. 8A, when first and second graphic contents 60 and 71 are provided in periods of Scene 2 and Scene 3, the electronic apparatus 100 may provide dynamic graphic metadata corresponding to each of the first and second graphic contents 60 and 71 to the display apparatus 200. This example embodiment may be implemented in a case in which a content producer provides the dynamic graphic metadata corresponding to each of the first and second graphic contents 60 and 71.

FIG. 8B is a detailed view for describing operations of the electronic apparatus 100 for implementing the example embodiment illustrated in FIG. 8A.

As illustrated in FIG. 8B, the electronic apparatus 100 may select the dynamic graphic metadata (e.g., graphic metadata 613) corresponding to each of the first and second graphic contents 60 and 71 from a dynamic metadata set and provide the selected dynamic graphic metadata to a metadata buffer 620 in a content period in which the graphic content is provided (operation of switch 1). Because this case is a case in which the content producer provides the dynamic graphic metadata corresponding to each of the first and second graphic contents 60 and 71, the corresponding metadata may be included in the dynamic metadata set.

The operations of the switches illustrated in FIGS. 6B, 7B, and 8B are provided to assist in an understanding of the present disclosure, and the electronic apparatus 100 is not necessarily implemented to actually include switches for selecting the metadata.

Figure 9:
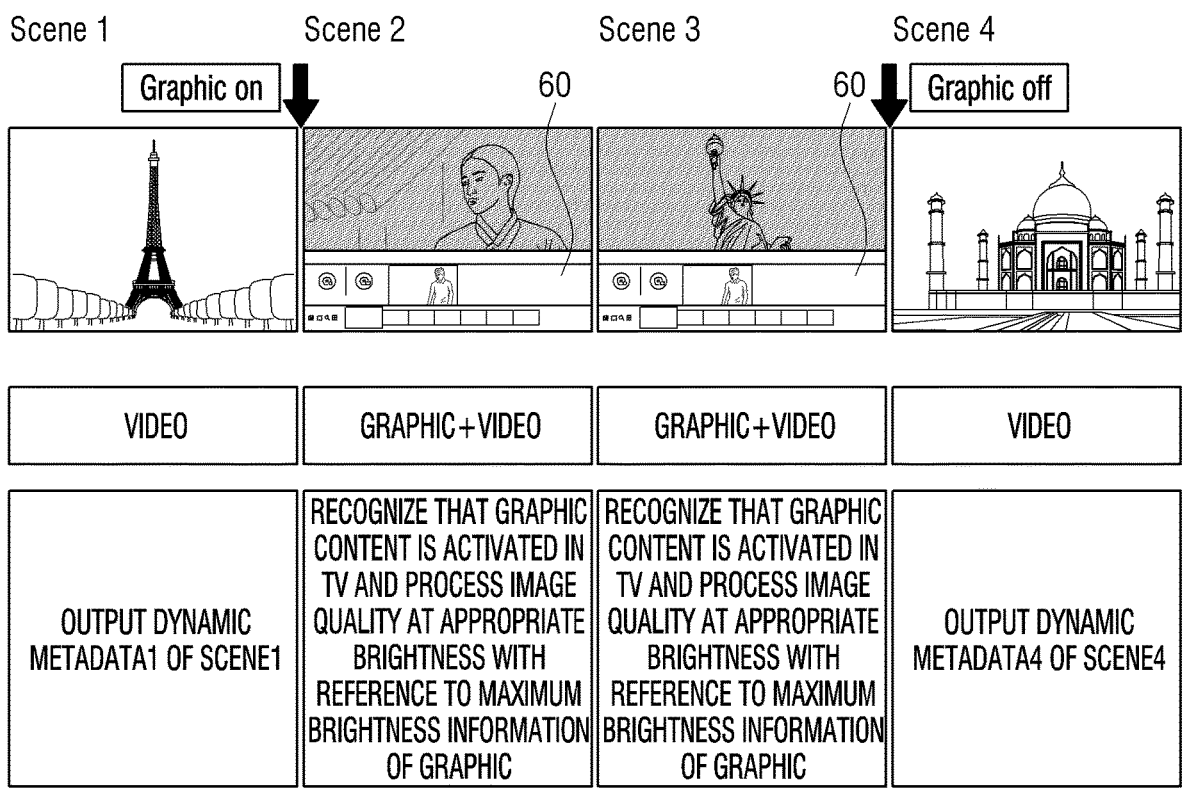
FIG. 9 shows views for describing a method of processing a graphic content according to yet still another example embodiment of the present disclosure.

FIG. 9 shows views for describing a method of processing a graphic content according to yet still another example embodiment of the present disclosure.

In FIG. 9, as illustrated, a case is assumed in which Scene 1, Scene 2, Scene 3, and Scene 4 of a video content are sequentially reproduced and in which graphic content 60 is provided in periods of Scene 2 and Scene 3.

In this case, the display apparatus 200 may appropriately perform image quality processing on video frames input during the periods of Scene 2 and Scene 3 in which the graphic content is activated based on information about whether or not the graphic content is activated, included in metadata, or the like. For example, as illustrated in FIG. 9, the display apparatus may perform image quality processing on the video frames input during the periods of Scene 2 and Scene 3 at an appropriate brightness based on maximum brightness information of the graphic content.

Figure 10:
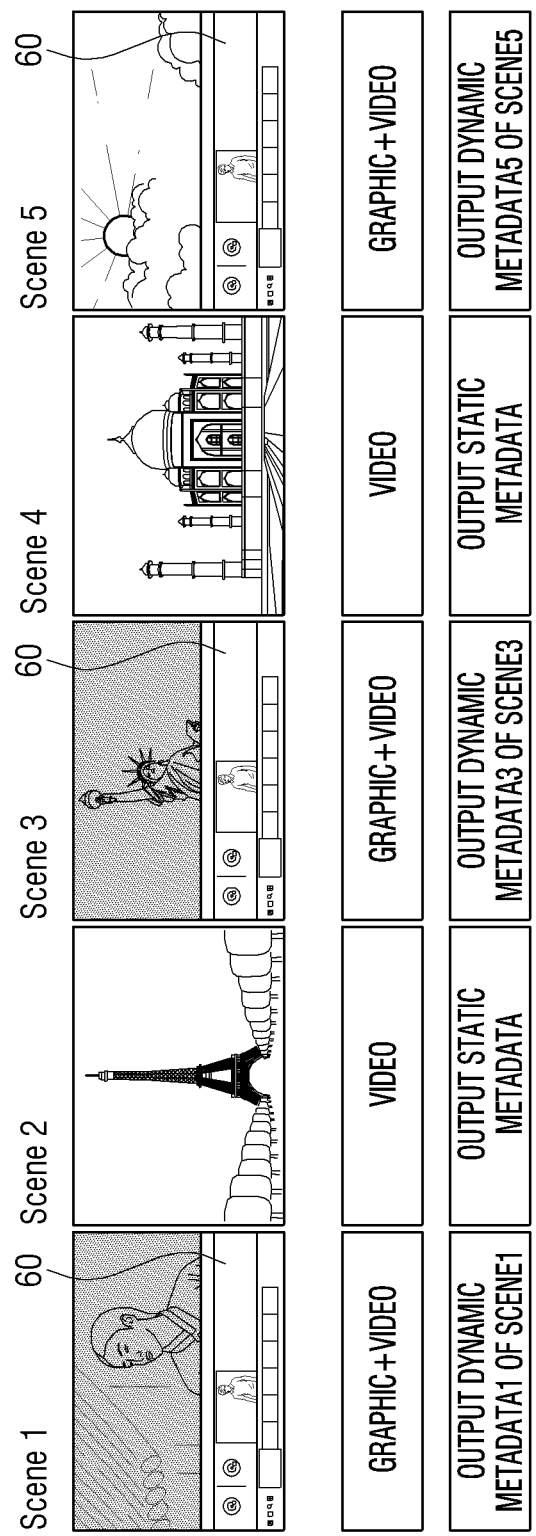
FIG. 10 shows views for describing a method of processing a graphic content according to yet still another example embodiment of the present disclosure.

FIG. 10 shows views for describing a method of processing a graphic content according to yet still another example embodiment of the present disclosure.

In FIG. 10, as illustrated, a case is assumed in which Scene 1, Scene 2, Scene 3, Scene 4, and Scene 5 of video content are sequentially reproduced and in which graphic content 60 is provided in periods of Scene 1, Scene 3, and Scene 5.

In this case, the electronic apparatus 100 may provide dynamic metadata corresponding to periods of each scene, that is, dynamic metadata 1, 3, and 5 in periods of Scene 1, Scene 3, and Scene 5, in which the graphic content 60 is provided. On the other hand, the electronic apparatus 100 may provide static metadata corresponding to at least one of the video content and the graphic content in periods of Scene 2 and Scene 4 in which the graphic content 60 is not provided. That is, the electronic apparatus 100 may provide dynamic HDR content to the display apparatus 200 in the periods of Scene 1, Scene 3, and Scene 5 in which the graphic content 60 is provided, and provide static HDR content to the display apparatus 200 in the periods of Scene 2 and Scene 4 in which the graphic content 60 is not provided.

Figure 11:
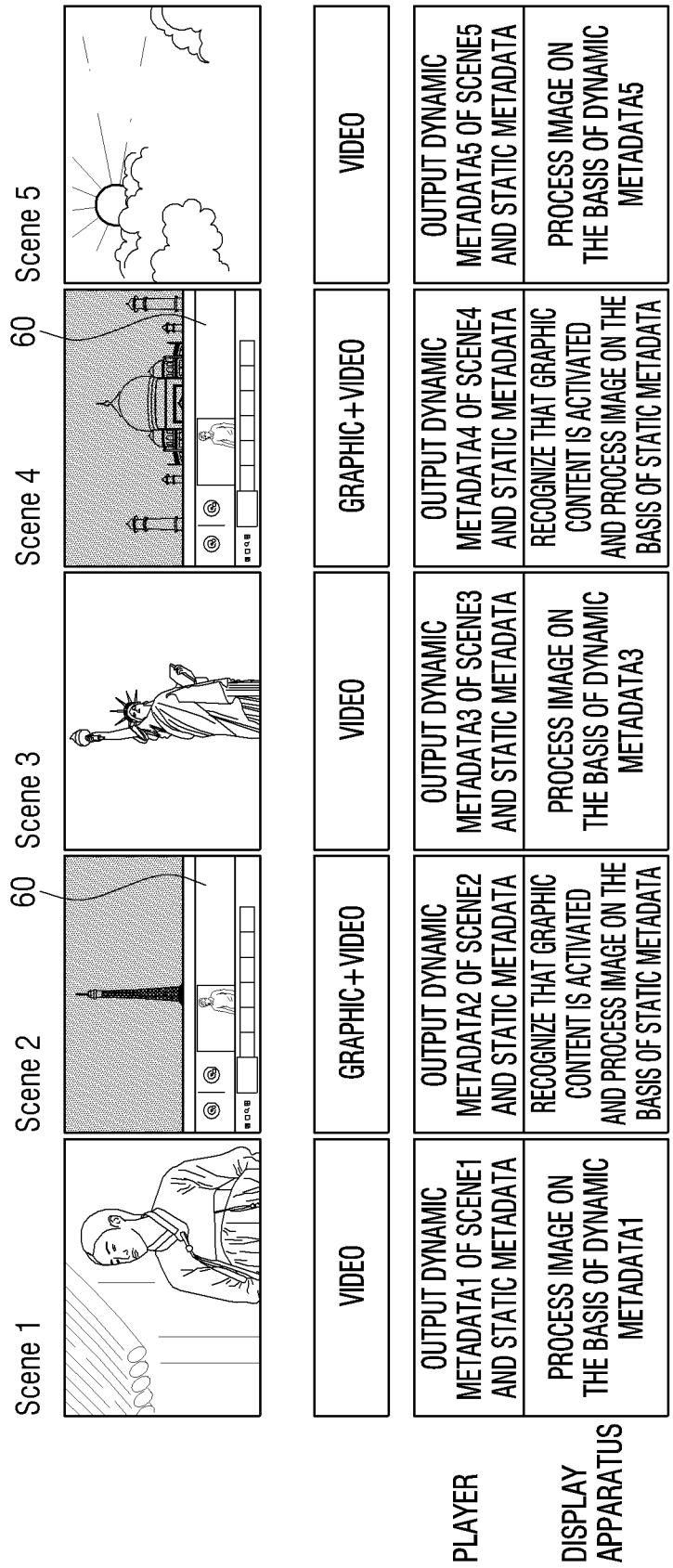
FIG. 11 shows views for describing a method of processing a graphic content according to yet still another example embodiment of the present disclosure.

FIG. 11 shows views for describing a method of processing a graphic content according to yet still another example embodiment of the present disclosure.

According to an example embodiment illustrated in FIG. 11, the electronic apparatus 100 may transmit to the display apparatus 200 dynamic metadata corresponding to each second content period (for example, scene) unit and static metadata corresponding to the content in a first content period (for example, frame) unit. For example, the electronic apparatus 100 may provide static metadata corresponding to the content while providing corresponding dynamic metadata, that is, dynamic metadata 1, 2, 3, 4, and 5, in periods of all the scenes, that is, periods of Scene 1 to Scene 5. In this case, the display apparatus 200 processes video content of each scene based on corresponding dynamic metadata, that is, dynamic metadata 1, 3, and 5, in periods in which the graphic content 60 is inactivated, that is, the period of Scenes 1, 3, and 5. In addition, the display apparatus 200 may process video content and graphic content based on the static metadata in content periods in which the graphic content 60 is activated, that is, periods of Scene 2 and Scene 4. In this case, the display apparatus 200 may decide whether or not the graphic content is activated based on information on whether or not the graphic content is activated, included in at least one of the dynamic metadata and the static metadata. For example, the corresponding information may be included by allocating one bit to a reserved region (for example, region 70 of FIGS. 7C to 7H) of at least one of the dynamic metadata and the static metadata. For example, when the corresponding bit value is "1", it may indicate that the graphic content is activated, and when the corresponding bit value is "0", it may indicate that the graphic content is inactivated. However, as another example, the information about whether or not graphic content is activated may also be included by replacing all the values included in the dynamic metadata with a predetermined value (for example, 0) and transmitting the dynamic metadata of which all the values are replaced with 0. In a case in which all the values included in the dynamic metadata are 0, the display apparatus 200 may recognize that the graphic content is activated, and process the video content and the graphic content based on the static metadata. However, hereinafter, a case in which the corresponding information is included using a specific bit value will be described for convenience of explanation.

According to an example, the dynamic metadata may include the corresponding information, and the display apparatus 200 may process the video content based on the dynamic metadata when the corresponding bit value included in the dynamic metadata is "0", and process the video content and the graphic content based on the static metadata when the corresponding bit value included in the dynamic metadata is "1". In this case, the display apparatus 200 may continuously monitor the dynamic metadata even in the case in which the display apparatus processes video content and graphic content based on static metadata, and process the video content based on the dynamic metadata when the corresponding bit value included in the dynamic metadata is changed into "0".

According to another example, the dynamic metadata and the static metadata may include the corresponding information, and the display apparatus 200 may monitor only the dynamic metadata at ordinary times, and process the video content based on the dynamic metadata when the corresponding bit value included in the dynamic metadata is "0" and process the video content and the graphic content based on the static metadata when the corresponding bit value included in the dynamic metadata is "1". However, in the case in which the display apparatus 200 processes the video content and the graphic content based on the static metadata, the display apparatus 200 does not monitor the dynamic metadata, and may process the video content again based on the dynamic metadata when the corresponding bit value included in the static metadata is "0".

According to still another example, only the static metadata may include the corresponding information. In this case, even in a case in which static metadata are not used, that is, even in the case in which graphic content is inactivated, the display apparatus 200 may continuously monitor the static metadata and identify whether or not the graphic content is activated.

Meanwhile the dynamic metadata corresponding to each scene and the static metadata corresponding to the content may be transmitted, for example, per frame. However, in some cases, it is possible to alternately transmit the least significant bit (LSB) values and the most significant bit (MSB) values of the static metadata.

Figure 12:
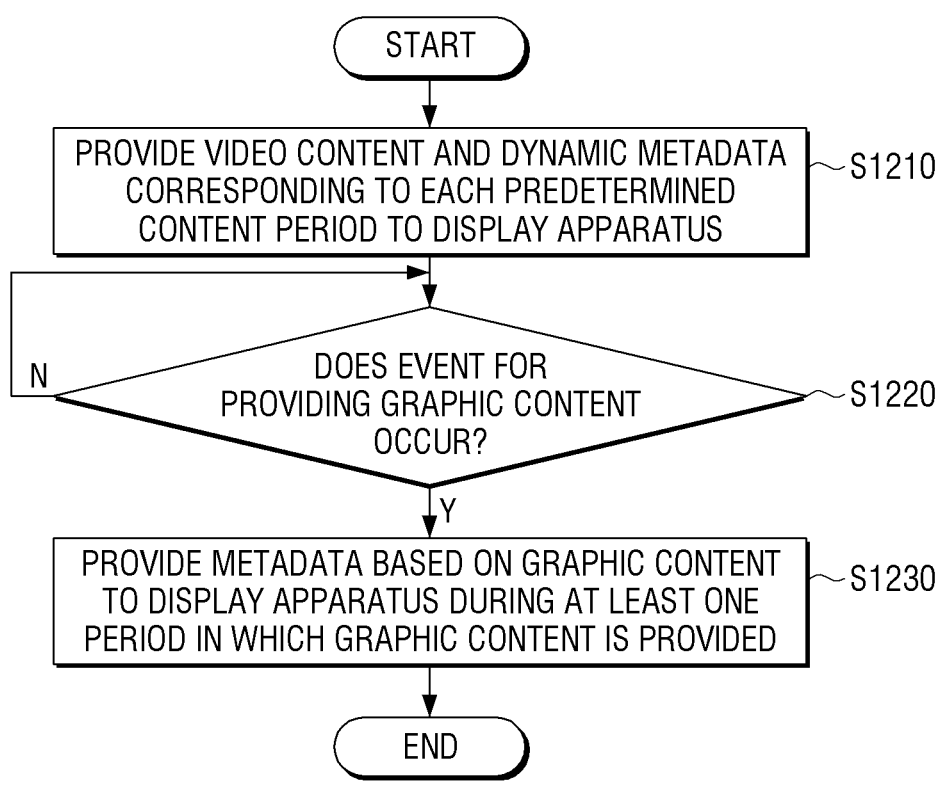
FIG. 12 is a flow chart for describing a control method of an electronic apparatus according to an example embodiment of the present disclosure.

FIG. 12 is a flow chart for describing a control method of an electronic apparatus according to an example embodiment of the present disclosure.

According to the control method of an electronic apparatus illustrated in FIG. 12, video content and dynamic metadata corresponding to each predetermined content period are provided to the display apparatus (S1210).

Then, when graphic content is activated (S1220:Y), the metadata based on the graphic content are provided to the display apparatus during at least one period in which the graphic content is activated (S1230). Here, the graphic content may include at least one of the IG, the PG, and the GUI.

In detail, in S1230, when graphic content is activated in a specific content period, the dynamic metadata corresponding to the video content of the specific content period may be provided to the display apparatus during the period in which the graphic content is activated.

Alternatively, in S1230, the predetermined static metadata corresponding to the graphic content may be provided to the display apparatus during the period in which the graphic content is activated.

Alternatively, in S1230, the predetermined static metadata corresponding to the video content may be provided to the display apparatus during the period in which the graphic content is activated.

Alternatively, in S1230, at least some of the dynamic metadata corresponding to each content period may be converted based on the static metadata of at least one of the video content and the graphic content, and the dynamic metadata of which at least some metadata are converted may be provided to the display apparatus, during the period in which the graphic content is activated.

As an example, in S1230, at least some of the brightness information of the content, the tone mapping information, the maximum brightness information of the mastering monitor, and the RGB information of the content (for example, distribution_maxrgb_percentiles, Bezier_curve_anchors, knee_point, targeted_system_display_maximum_luminance, average_maxrgb, and the like) included in the dynamic metadata corresponding to each content period may be replaced with at least some of the maximum brightness information of the content and the maximum brightness information of the mastering monitor (for example, max_display_mastering_luminance and Maximum Content Light Level) included in the static metadata, and the dynamic metadata of which at least some metadata are replaced may be provided to the display apparatus 200, during the period in which the graphic content is activated.

As another example, in S1230, calculated values may be obtained by calculating at least some of the maximum brightness information of the content and the maximum brightness information of the mastering monitor included in the static metadata according to, for example, a predetermined equation, and at least some of the brightness information of the content, the tone mapping information, the maximum brightness information of the mastering monitor, and the RGB information of the content included in the dynamic metadata corresponding to each content period may be replaced with the obtained calculated values and the dynamic metadata of which at least some metadata are replaced may be provided to the display apparatus 200, during the period in which the graphic content is activated.

Alternatively, S1230, at least one of the pixel value and the brightness value of the graphic content may be changed based the dynamic metadata corresponding to the video content, and the graphic content of which at least one of the pixel value and the brightness value is changed may be provided to the display apparatus 200, during the period in which the graphic content is activated.

Here, in S1220, the identifying of whether or not graphic content is activated may be based on at least one of the API and a predetermined program. In addition, if necessary, identified information may be inserted into at least one of the static metadata and the dynamic metadata.

Figure 13:
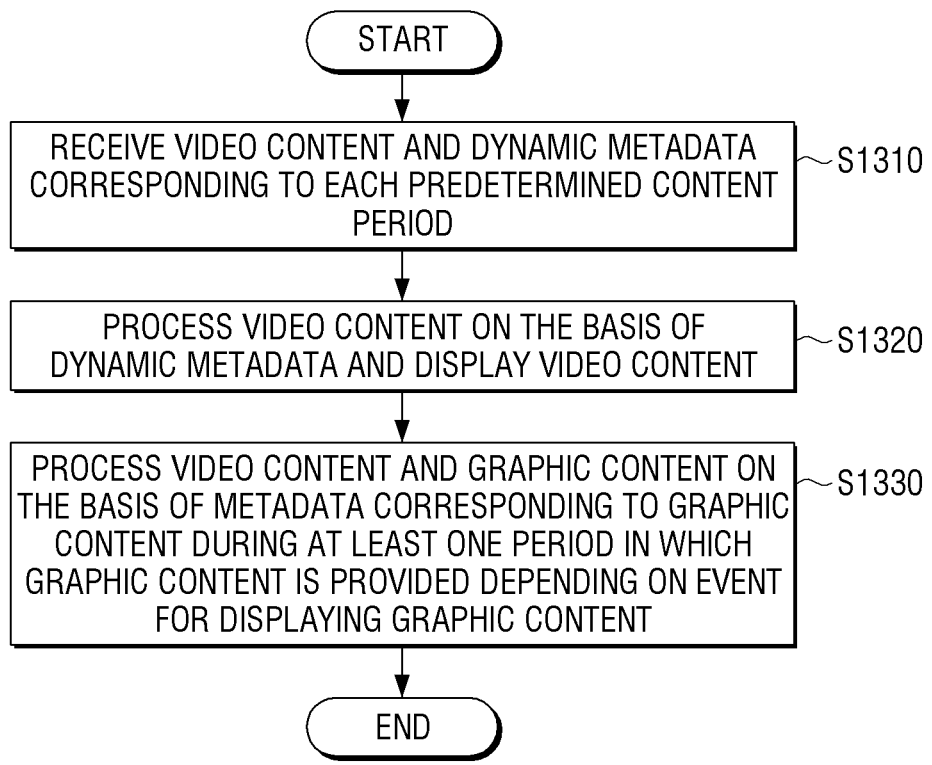
FIG. 13 is a flow chart for describing a control method of a display apparatus according to an example embodiment of the present disclosure.

FIG. 13 is a flow chart for describing a control method of a display apparatus according to an example embodiment of the present disclosure.

According to the control method of an electronic apparatus 200 illustrated in FIG. 13, video content and dynamic metadata corresponding to each predetermined content period are from received from the electronic apparatus 100 (S1310).

Then, the video content is processed based on the received dynamic metadata, and is displayed (S1320).

Then, the video content and the graphic content are processed based on the metadata based on graphic content during at least one content period in which the graphic content is activated (S1330).

The metadata based on the graphic content may include one of dynamic metadata corresponding to a specific content period in which the graphic content is activated, pre-stored metadata corresponding to the graphic content, static metadata corresponding to the graphic content, static metadata corresponding to the video content, and dynamic metadata converted from the dynamic metadata based on the static metadata of at least one of the video content and the graphic content.

As an example, the converted dynamic metadata may be metadata obtained by replacing at least some of the brightness information of the content, the tone mapping information, the maximum brightness information of the mastering monitor, and the RGB information of the content included in the dynamic metadata corresponding to each content period with at least some of the maximum brightness information of the content and the maximum brightness information of the mastering monitor included in the static metadata of at least one of the video content and the graphic content.

As another example, the converted dynamic metadata may be metadata obtained by replacing at least some of the brightness information of the content, the tone mapping information, the maximum brightness information of the mastering monitor, and the RGB information of the content included in the dynamic metadata corresponding to each content period with calculated values obtained by calculating at least some of the maximum brightness information of the content and the maximum brightness information of the mastering monitor included in the static metadata of at least one of the video content and the graphic content according to a predetermined equation.

In addition, in the control method, when information indicating whether or not graphic content is activated and characteristics of the graphic content is received, image processing may be performed on the video content and the graphic content, that is, the frames received during at least one period in which the graphic content is activated, based on the characteristics of the graphic content during at least one period in which the graphic content is activated. However, in the case in which it is identified whether or not the graphic content is activated and the corresponding static metadata and the dynamic metadata are transmitted, the information indicating whether or not the graphic content is activated and the characteristics of the graphic content is not received from the electronic apparatus 100 separately.

According to another example embodiment, in a case in which the dynamic metadata and the static metadata for each frame are received from the electronic apparatus 100, the video content may be processed based on dynamic metadata during the period in which the graphic content is inactivated, and the video content and the graphic content may be processed based on static metadata during the content period in which the graphic content is activated. In this case, the display apparatus 200 may decide whether or not the graphic content is activated based on information about whether or not the graphic content is activated, included in at least one of the dynamic metadata and the static metadata.

According to the diverse example embodiments described above, the brightness, the color sense, and the like, of graphic content provided during a period in which the dynamic HDR content is provided may be maintained. In addition, graphic content may be provided at the brightness and the color sense of the graphic content intended by the graphic content producer.

The control methods according to the diverse example embodiments of the present disclosure described above may be implemented in a form of an application that may be installed in at least one of the existing electronic apparatus and display apparatus.

In addition, control methods according to the diverse example embodiments of the present disclosure described above may be implemented by only software upgrade or hardware upgrade for at least one of existing electronic apparatus and display apparatus.

Further, the diverse example embodiments of the present disclosure described above may be executed through an embedded server provided in at least one of the electronic apparatus and the display apparatus or an external server of at least one of the electronic apparatus and the display apparatus.

Meanwhile, the diverse example embodiments of the present disclosure described above may be implemented in a computer or a computer readable recording medium using software, hardware, or a combination of software and hardware. In some cases, example embodiments described in the present disclosure may be implemented by the processors 120 and 230 themselves. According to a software implementation, example embodiments such as procedures and functions described in the present disclosure may be implemented by separate software modules. Each of the software modules may perform one or more functions and operations described in the present disclosure.

Meanwhile, computer instructions for performing processing operations of the electronic apparatus and the display apparatus according to the diverse example embodiments of the present disclosure described above may be stored in a non-transitory computer-readable medium. The computer instructions stored in the non-transitory computer-readable medium allow a specific device to perform the processing operations of the electronic apparatus and the display apparatus according to the diverse example embodiments described above when they are executed by a processor of the specific device.

A specific example of a non-transitory computer-readable medium may include a compact disk (CD), a digital versatile disk (DVD), a hard disk, a Blu-ray disk, a universal serial bus (USB), a memory card, a read only memory (ROM), or the like.

Although example embodiments of the present disclosure have been illustrated and described hereinabove, the present disclosure is not limited to the abovementioned specific example embodiments, but may be variously modified by those skilled in the art to which the present disclosure pertains without departing from the gist of the present disclosure as disclosed in the accompanying claims. These modifications should also be understood to fall within the scope and spirit of the present disclosure.

What is claimed is:
1. An electronic apparatus comprising:
a communication interface including communication interface circuitry; and
a processor configured to provide video content and metadata corresponding to video content for each predetermined content period to an external display apparatus through the communication interface,
wherein the processor is configured to, based on at least one content period including graphic content, convert dynamic metadata for the video content into converted metadata comprising both static metadata for the graphic content and the dynamic metadata for the video content, and provide the converted metadata to the display apparatus during the at least one content period including the graphic content,
wherein the processor is configured so that at least some of the dynamic metadata originally corresponding to the at least one content period including graphic content is replaced with the static metadata for the graphic content in the converted metadata, at least some of the dynamic metadata originally corresponding to the at least one content period including graphic content is replaced with values calculated based on the static metadata in the converted metadata, and at least some of the dynamic metadata originally corresponding to the at least one content period including graphic content is provided in the converted metadata without modification, and the dynamic metadata is converted into the converted metadata, including both the static and dynamic metadata, based on a luminance of the external display apparatus, while a format of the dynamic metadata is maintained in the converted metadata.

2. The electronic apparatus as claimed in claim 1, wherein the processor is configured to convert the dynamic metadata into converted metadata by replacing at least some of brightness information of content, tone mapping information, maximum brightness information of a mastering monitor, and RGB information of the content included in the dynamic metadata corresponding to each content period with at least some of maximum brightness information of the content and maximum brightness information of the mastering monitor included in the static metadata and provide the converted metadata to the display apparatus, during the period including the graphic content.

3. The electronic apparatus as claimed in claim 1, wherein the processor is configured to
obtain calculated values by calculating at least one of maximum brightness information of content and maximum brightness information of a mastering monitor included in the static metadata according to a predetermined equation, and
convert the dynamic metadata into converted metadata by replacing at least some of brightness information of the content, tone mapping information, maximum brightness information of the mastering monitor, and RGB information of the content included in the dynamic metadata corresponding to each content period with the obtained calculated values and provide the dynamic metadata of which at least some metadata are replaced to the display apparatus, during the period including the graphic content.

4. The electronic apparatus as claimed in claim 1, wherein the processor is configured to change a pixel value of the graphic content based on the dynamic metadata corresponding to the video content and provide the graphic content of which the pixel value is changed to the display apparatus, during the period including the graphic content.

5. The electronic apparatus as claimed in claim 1, wherein the processor is configured to identify whether or not the at least one content period includes the graphic content based on a user command.

6. The electronic apparatus as claimed in claim 1, wherein the processor is configured to identify whether or not the at least one content period includes the graphic content based on at least one of an application programming interface (API) and a predetermined program.

7. The electronic apparatus as claimed in claim 1, wherein the graphic content includes at least one of an interactive graphic (IG), a presentation graphic (PG), and a graphical user interface (GUI).

8. A display apparatus comprising:
a communication interface including communication interface circuitry;
a display; and
a processor configured to, based on receiving video content and dynamic metadata corresponding to video content for each content period from an external electronic apparatus through the communication interface, process the video content based on the dynamic metadata, and display the processed video content on the display,
wherein the processor is configured to process the video content and graphic content based on converted metadata into which the dynamic metadata is converted during at least one content period including the graphic content, the converted metadata comprising both static metadata for the graphic content and the dynamic metadata for the video content,
wherein the processor is configured so that at least some of the dynamic metadata originally corresponding to the at least one content period including graphic content is replaced with the static metadata for the graphic content in the converted metadata, at least some of the dynamic metadata originally corresponding to the at least one content period including graphic content is replaced with values calculated based on the static metadata in the converted metadata, and at least some of the dynamic metadata originally corresponding to the at least one content period including graphic content is provided in the converted metadata without modification, and
wherein the processor is configured so that the dynamic metadata is converted into the converted metadata, including both the static and dynamic metadata, based on a luminance of the display, while a format of the dynamic metadata is maintained in the converted metadata.

9. The display apparatus as claimed in claim 8, wherein the metadata based on the graphic content includes at least one of dynamic metadata corresponding to a specific content period in which the graphic content is activated, pre-stored metadata corresponding to the graphic content, static metadata corresponding to the graphic content, static metadata corresponding to the video content, and metadata converted from dynamic metadata corresponding to each content period based on static metadata of at least one of the video content and the graphic content.

10. The display apparatus as claimed in claim 8, wherein the converted metadata includes metadata obtained by replacing at least some of brightness information of content, tone mapping information, maximum brightness information of a mastering monitor, and RGB information of the content included in dynamic metadata corresponding to each content period with at least one of the maximum brightness information of the content and maximum brightness information of the mastering monitor included in static metadata of at least one of the video content and the graphic content.

11. The display apparatus as claimed in claim 8, wherein the converted metadata includes metadata obtained by replacing at least some of brightness information of a content, tone mapping information, maximum brightness information of a mastering monitor, and RGB information of the content included in dynamic metadata corresponding to each content period with calculated values obtained by calculating at least one of the maximum brightness information of the content and maximum brightness information of the mastering monitor included in static metadata of at least one of the video content and the graphic content according to a predetermined equation.

12. The display apparatus as claimed in claim 8, wherein the processor is configured to process the video content and the graphic content based on characteristics of the graphic content during the at least one content period including the graphic content, based on receiving information indicating whether or not the graphic content is activated and the characteristics of the graphic content from the electronic apparatus.

13. The display apparatus as claimed in claim 8, wherein the processor is configured to
control receiving the dynamic metadata and the converted metadata from the external electronic apparatus,
process the video content based on the dynamic metadata during a period including the graphic content, and
process the video content and the graphic content based on the converted metadata during a period not including the graphic content.

14. A control method of an electronic apparatus, comprising:
providing video content and metadata corresponding to video content of each predetermined content period to an external display apparatus; and
based on at least one content period including graphic content, converting dynamic metadata for the video content into converted metadata comprising both static metadata for the graphic content and the dynamic metadata for the video content, and providing converted metadata based on graphic content to the display apparatus during the at least one content period including the graphic content, wherein at least some of the dynamic metadata originally corresponding to the at least one content period including graphic content is replaced with the static metadata for the graphic content in the converted metadata, at least some of the dynamic metadata originally corresponding to the at least one content period including graphic content is replaced with values calculated based on the static metadata in the converted metadata, and at least some of the dynamic metadata originally corresponding to the at least one content period including graphic content is provided in the converted metadata without modification, and wherein the dynamic metadata is converted into the converted metadata, including both the static and dynamic metadata, based on a luminance of the external display apparatus, while a format of the dynamic metadata is maintained in the converted metadata.

15. The control method as claimed in claim 14, wherein the providing of the converted metadata to the display apparatus comprises, obtaining calculated values by calculating at least one of maximum brightness information of content and maximum brightness information of a mastering monitor included in the static metadata according to a predetermined equation, and replacing at least some of brightness information of the content, tone mapping information, maximum brightness information of the mastering monitor, and RGB information of the content included in the dynamic metadata corresponding to each content period with the obtained calculated values and providing to the display apparatus, during the period comprising the graphic content.

* * * * *